United States Patent
Fleming et al.

(12) 
(10) Patent No.: US 6,523,035 B1
(45) Date of Patent: Feb. 18, 2003

(54) SYSTEM AND METHOD FOR INTEGRATING A PLURALITY OF DISPARATE DATABASE UTILITIES INTO A SINGLE GRAPHICAL USER INTERFACE

(75) Inventors: Alexander T. Fleming, Austin, TX (US); William W. Wallace, Austin, TX (US)

(73) Assignee: BMC Software, Inc., Houston, TX (US)

( * ) Notice: Subject to any disclaimer, the term of this patent is extended or adjusted under 35 U.S.C. 154(b) by 0 days.

(21) Appl. No.: 09/315,300

(22) Filed: May 20, 1999

(51) Int. Cl.$^7$ .............................. G06F 17/30; G06F 7/00
(52) U.S. Cl. ....................................................... 707/10
(58) Field of Search .................... 707/104, 10, 100, 707/200, 101, 104.1, 201, 202, 203, 204, 205, 102, 103 R, 103 Y

(56) References Cited

U.S. PATENT DOCUMENTS 5,987,465 A * 11/1999 Kleewein et al. ............. 707/10
6,148,323 A * 11/2000 Whitner et al. ............. 709/105

OTHER PUBLICATIONS

"Microsoft Management Console: Overview," 1999 Microsoft Corporation, pp. 1–55.*
Pleas et al., "Microsoft Management Console," Windows NT Magazine, Feb. 1997, pp. 1–3.
"Microsoft Management Console: Overview,"©1999 Microsoft Corporation, pp. 1–55.

* cited by examiner

*Primary Examiner*—John Breene
*Assistant Examiner*—Susan F. Rayyan
(74) *Attorney, Agent, or Firm*—Wong, Cabello, Lutsch, Rutherford & Brucculeri, P.C.

(57) ABSTRACT

An improved management console integrates a plurality of disparate database utilities with a unified graphical user interface. A management console is implemented or otherwise provided in accordance with an industry standard such as the MICROSOFT Management Console (MMC) framework or a superset thereof. MMC provides a common environment for snap-ins that provide management or administrative functionality. The improved management console includes a primary snap-in and a plurality of extension snap-ins. The primary snap-in is preferably a database browser which permits the console user to "drill down" through a hierarchy of database-related objects such as tablespaces, tables, records, and meta-data. The database browser snap-in preferably supports a plurality of different database management systems. The extension snap-ins provide additional functionality by extending the primary snap-in to provide access to database utilities or tasks. Each extension snap-in is preferably linked to an associated GUI wizard. A GUI wizard provides a step-by-step user interface for the extension snap-in and the associated database utility. The GUI wizard can be launched from the management console or from any other suitable location when the wizard is implemented as a reusable software component.

35 Claims, 28 Drawing Sheets

SYSTEM AND METHOD FOR INTEGRATING A PLURALITY OF DISPARATE DATABASE UTILITIES INTO A SINGLE GRAPHICAL USER INTERFACE

CROSS-REFERENCE TO RELATED APPLICATIONS

This application is related to U.S. patent application Ser. No. 09/315,313 filed herewith on May 20, 1999, and entitled, "SYSTEM AND METHOD FOR INTEGRATING A PLURALITY OF DISPARATE DATABASE UTILITIES INCLUDING A UTILITY PROXY."

BACKGROUND OF THE INVENTION

1. Field of the Invention

This invention relates generally to computer software. More particularly, the invention relates to management of database systems and to user interfaces for database utilities.

2. Description of the Related Art

The data processing resources of business organizations are increasingly taking the form of a distributed computing environment in which data and processing are dispersed over a network comprising many interconnected computers, often heterogeneous and/or geographically remote. Such a computing environment is commonly referred to as an enterprise computing environment or enterprise. In many business organizations, the enterprise includes at least one database management system (DBMS). Often, however, large organizations employ multiple, disparate databases to support mission-critical applications. With the increasing complexity caused by the need to support multiple database management systems (DBMSs) from different vendors, administration of the enterprise can be difficult. Furthermore, administration of the enterprise may additionally require administration of other subsystems, such as application programs and utilities.

A common management console is one way to manage a plurality of subsystems running on one or more networked computer systems. The Microsoft Management Console (MMC) is one example of a management console framework. Although MMC provides a public specification for interfaces between "snap-in" modules and the management console, MMC does not govern the behavior of the snap-ins, nor their graphical user interfaces (GUIs). Instead, individual snap-ins provide administration functionality and a graphical user interface.

Many database management systems are deployed on database server computer systems along with associated utilities for database access. These utilities may provide functions such as performing queries, defragmenting database memory, creating or deleting tables or records, and other suitable functions. However, existing utilities from different vendors often have different graphical user interfaces or no interfaces at all. That is, even though utilities for different database management systems may share functions in common, their user interfaces may be substantially different.

The disparate nature of database utilities leads to many problems. For example, it is confusing for utilities to have their own GUIs, even for similar functions, and therefore it is difficult for users to learn and then utilize different GUIs. These difficulties translate into increased training costs or the need to hire additional, specialized database managers. Disparate utilities with disparate GUIs are therefore cumbersome and expensive to maintain. Furthermore, utilities from different vendors may have incompatible interfaces which make integration difficult. For example, it can be difficult or even impossible to combine disparate utilities or to customize the management console in the field.

Therefore, it is desirable to provide an improved system and method for managing disparate database utilities.

SUMMARY OF THE INVENTION

The present invention provides various embodiments of a method and system for integrating a plurality of disparate database utilities with a unified graphical user interface. In one embodiment, a management console is implemented or otherwise provided in accordance with an industry standard such as the MICROSOFT Management Console (MMC) framework. In a further embodiment, the management console is implemented in accordance with a superset of MMC such as the BMC Management Console (BMCMC). A framework such as MMC provides a common environment for snap-ins that provide management or administrative functionality.

In one embodiment, the management console comprises a window which includes a scope pane and a result pane. The scope pane contains a hierarchical view of manageable items and options through which the console user may navigate. The hierarchy may include database objects such as tablespaces, tables, records, meta-data, and other suitable database information. The console software program provides a root node in the hierarchy of nodes; snap-ins provide the additional nodes. The result pane contains various types of information, such as a list of options, a task pad, or an ACTIVEX control, resulting from a selection of an item in the scope pane. A task pad is preferably a user-friendly interface that is designed to guide a novice user through one or more administrative tasks.

In one embodiment, the improved management console includes a primary snap-in and a plurality of extension snap-ins. The primary snap-in is preferably a database browser which permits the console user to "drill down" through a hierarchy of database-related objects such as, for example, tablespaces, tables, records, and meta-data. The database browser snap-in preferably supports a plurality of different database management systems (DBMSs). The extension snap-ins provide additional functionality by linking to and extending the primary snap-in to provide access to database utilities or tasks. Graphical representations of these snap-ins are displayed in the management console.

Each extension snap-in may be linked to an associated GUI wizard. A GUI wizard provides a step-by-step user interface for the extension snap-in and the associated database utility. The GUI wizard can be launched from the management console or from any other suitable location when the wizard is implemented as a reusable software component.

In one embodiment, the management console runs on a client computer system. The client computer system is one node in an enterprise computer system comprising a plurality of networked nodes. Typically, the console, snap-ins, and wizards are located on the client side. One or more DBMSs and utilities typically reside on one or more server computer systems.

In a further embodiment, the improved management console includes a utility proxy for remote execution of a database utility. The utility proxy may be located on the client side. When the console user desires to configure or execute a task, the console provides configuration or execution instructions to the utility proxy. The utility proxy sends the configuration or execution instructions to a utility back-end on the server. The utility back-end listens for instructions from the utility proxy and then sends the instructions to the utility or directly to the DBMS. In a further embodiment, the utility back-end is combined with the utility in a single component. The utility proxy and back-end provide improved versioning and modularity to the management console. In one embodiment, the utility proxy further provides job management for a particular utility.

In one embodiment, the snap-ins and other components are implemented in accordance with an industry standard, such as the Component Object Model (COM) or Distributed Component Object Model (DCOM), for reusable software components.

BRIEF DESCRIPTION OF THE DRAWINGS

The objects and advantages of the invention will become apparent upon reading the following detailed description and upon reference to the accompanying drawings in which.

Figure 1:
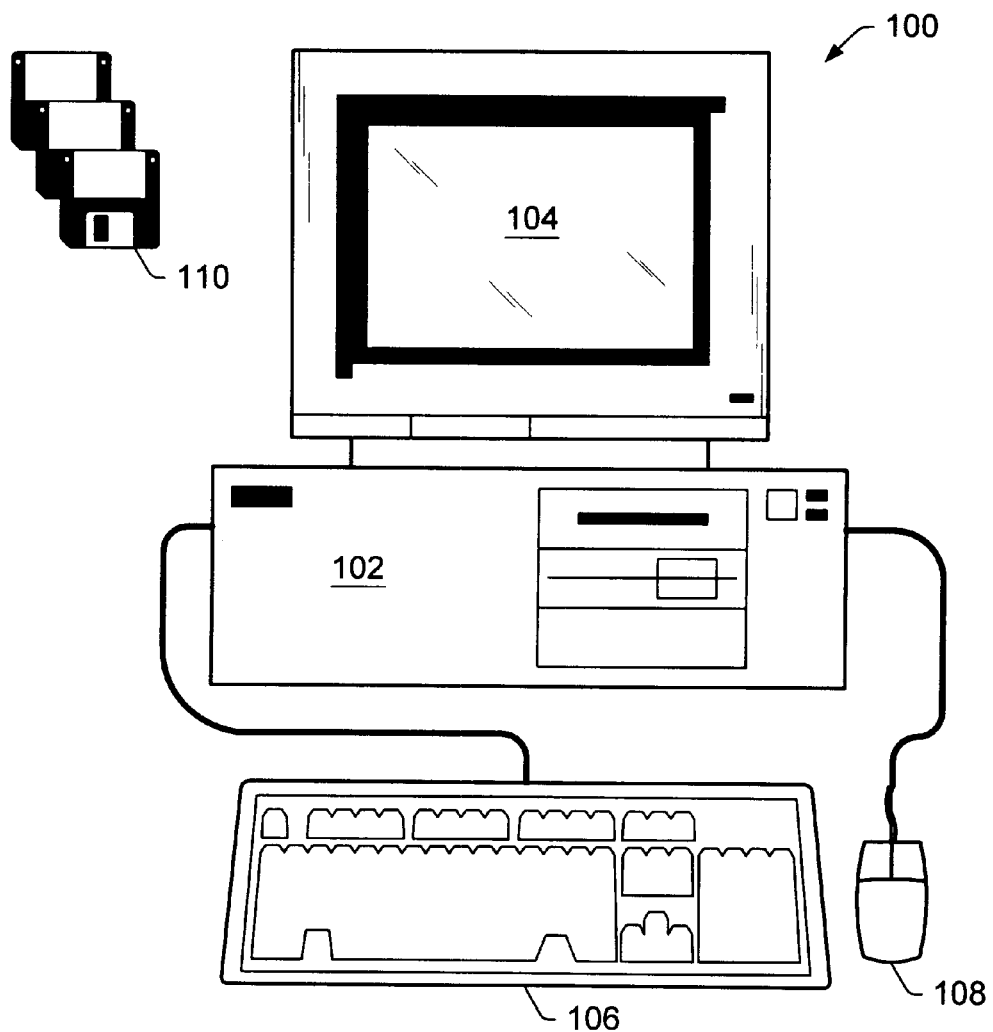
FIG. 1 illustrates a computer system which is suitable for implementing an improved management console with a unified GUI according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE PREFERRED EMBODIMENTS

FIG. 1—A Typical Computer System

FIG. 1 illustrates a typical, general-purpose computer system 100 which is suitable for implementing an improved management console according to one embodiment. The computer system 100 typically comprises components such as computing hardware 102, a display device such as a monitor 104, an alphanumeric input device such as a keyboard 106, and optionally an input device such as a mouse 108. The computer system 100 is operable to execute computer programs which may be stored on disks 110 or in computing hardware 102. In various embodiments, the computer system 100 may comprise a desktop computer, a laptop computer, a palmtop computer, a network computer, a personal digital assistant (PDA), an embedded device, a smart phone, or any other suitable computing device.

Figure 2:
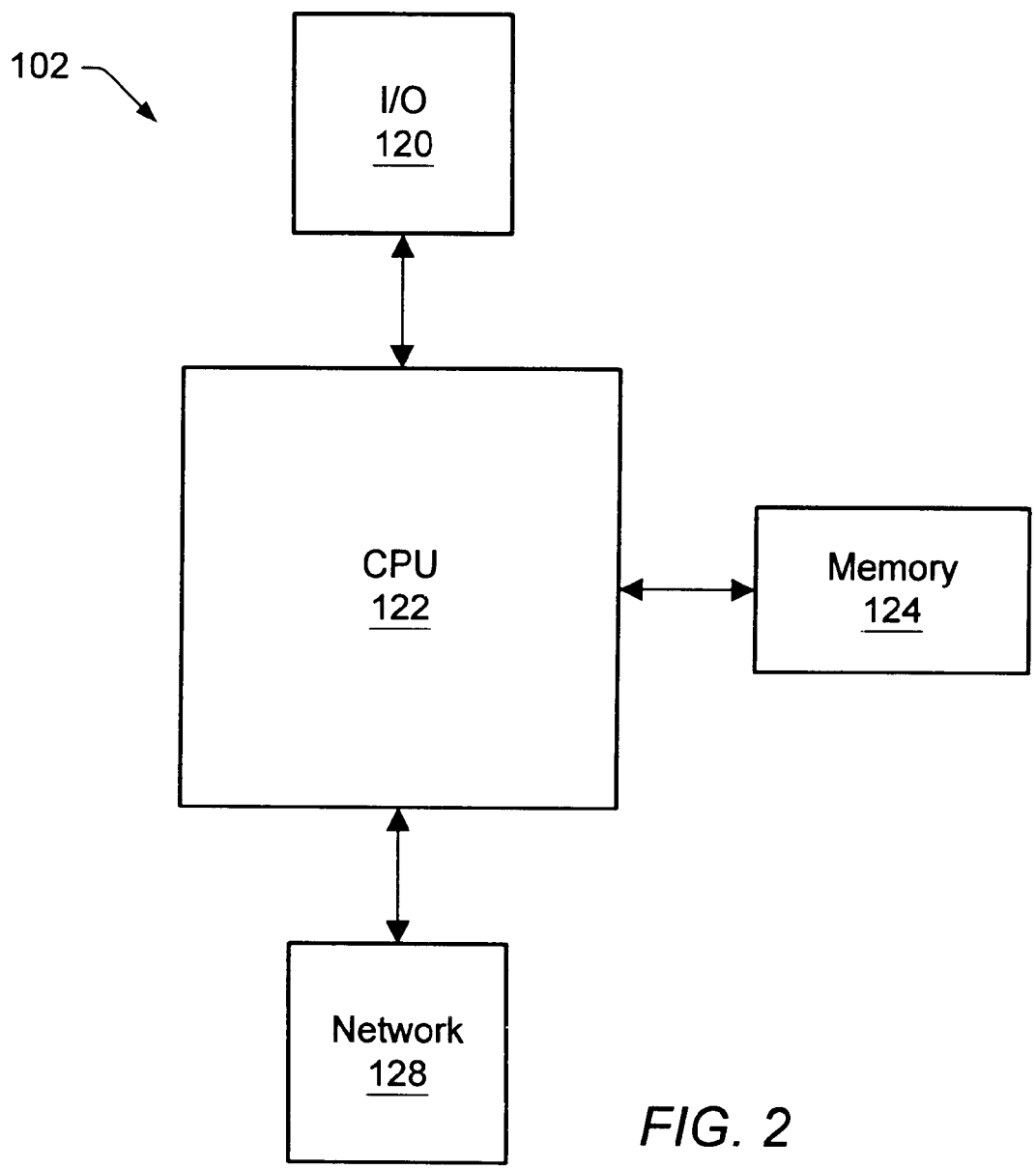
FIG. 2 is a block diagram of the computer system of FIG. 1 which is suitable for implementing an improved management console with a unified GUI according to one embodiment.

FIG. 2—Computing Hardware of a Typical Computer System

FIG. 2 is a block diagram illustrating the computing hardware 102 of a typical, general-purpose computer system 100 which is suitable for implementing an improved management console according to one embodiment. The computing hardware 102 includes at least one central processing unit (CPU) or other processor(s) 122. The CPU 122 is configured to execute program instructions which implement the improved management console as described herein. The CPU 122 is preferably coupled to a memory medium 124.

As used herein, the term "memory medium" includes a non-volatile medium, e.g., a magnetic medium, hard disk, or optical storage; a volatile medium, such as computer system memory, e.g., random access memory (RAM) such as DRAM, SDRAM, SRAM, EDO RAM, Rambus RAM, etc.; or an installation medium, such as CD-ROM, floppy disks, or a removable disk, on which computer programs are stored for loading into the computer system. The term "memory medium" may also include other types of memory. The memory medium 124 may therefore store program instructions and/or data which implement the improved management console as described herein. Furthermore, the memory medium 124 may be utilized to install the program instructions and/or data. In a further embodiment, the memory medium 124 may be comprised in a second computer system which is coupled to the computer system 100 through a network 128. In this instance, the second computer system may operate to provide the program instructions stored in the memory medium 124 through the network 128 to the computer system 100 for execution.

The CPU 122 may also be coupled through an input/output bus 120 to one or more input/output devices that may include, but are not limited to, a display device such as a monitor 104, a pointing device such as a mouse 108, a keyboard 106, a track ball, a microphone, a touch-sensitive display, a magnetic or paper tape reader, a tablet, a stylus, a voice recognizer, a handwriting recognizer, a printer, a plotter, a scanner, and any other devices for input and/or output. The computer system 100 may acquire program instructions and/or data for implementing the improved management console as described herein through the input/output bus 120.

The CPU 122 may include a network interface device 128 for coupling to a network. The network may be representative of various types of possible networks: for example, a local area network (LAN), wide area network (WAN), or the Internet. The improved management console as described herein may therefore be implemented on a plurality of heterogeneous or homogeneous networked computer systems such as computer system 100 through one or more networks. Each computer system 100 may acquire program instructions and/or data for implementing the improved management console as described herein over the network.

Figure 3:
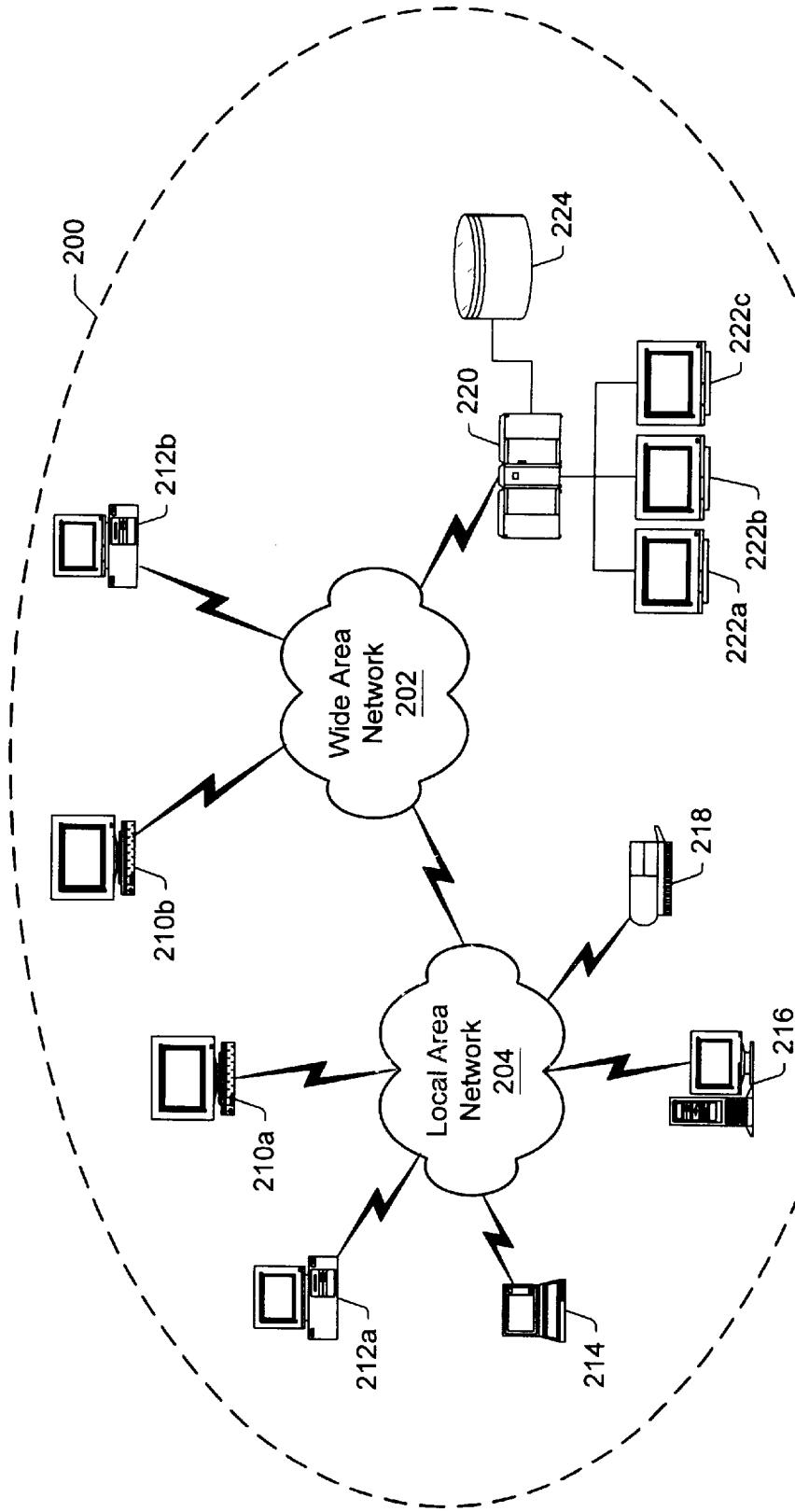
FIG. 3 illustrates an enterprise computing environment which is suitable for implementing an improved management console with a unified GUI according to one embodiment.

FIG. 3—A Typical Enterprise Computing Environment

FIG. 3 illustrates an enterprise computing environment 200 according to one embodiment. An enterprise 200 comprises a plurality of computer systems such as computer system 100 which are interconnected through one or more networks. Although one particular embodiment is shown in FIG. 3, the enterprise 200 may comprise a variety of heterogeneous computer systems and networks which are interconnected in a variety of ways and which run a variety of software applications.

One or more local area networks (LANs) 204 may be included in the enterprise 200. A LAN 204 is a network that spans a relatively small area. Typically, a LAN 204 is confined to a single building or group of buildings. Each node (i.e., individual computer system or device) on a LAN 204 preferably has its own CPU with which it executes computer programs, and often each node is also able to access data and devices anywhere on the LAN 204. The LAN 204 thus allows many users to share devices (e.g., printers) as well as data stored on file servers. The LAN 204 may be characterized by any of a variety of types of topology (i.e., the geometric arrangement of devices on the network), of protocols (i.e., the rules and encoding specifications for sending data, and whether the network uses a peer-to-peer or client/server architecture), and of media (e.g., twisted-pair wire, coaxial cables, fiber optic cables, radio waves). FIG. 3 illustrates an enterprise 200 including one LAN 204. However, the enterprise 200 may include a plurality of LANs 204 which are coupled to one another through a wide area network (WAN) 202. A WAN 202 is a network that spans a relatively large geographical area.

Each LAN 204 comprises a plurality of interconnected computer systems or at least one computer system and at least one other device. Computer systems and devices which may be interconnected through the LAN 204 may include, for example, one or more of a workstation 210a, a personal computer 212a, a laptop or notebook computer system 214, a server computer system 216, or a network printer 218. An example LAN 204 illustrated in FIG. 3 comprises one of each of these computer systems 210a, 212a, 214, and 216 and one printer 218. Each of the computer systems 210a, 212a, 214, and 216 is preferably an example of the typical computer system 100 as illustrated in FIGS. 1 and 2. The LAN 204 may be coupled to other computer systems and/or other devices and/or other LANs 204 through a WAN 202.

A mainframe computer system 220 may optionally be coupled to the enterprise 200. As shown in FIG. 3, the mainframe 220 is coupled to the enterprise 200 through the WAN 202, but alternatively the mainframe 220 may be coupled to the enterprise 200 through a LAN 204. As shown in FIG. 3, the mainframe 220 is coupled to a storage device or file server 224 and mainframe terminals 222a, 222b, and 222c. The mainframe terminals 222a, 222b, and 222c access data stored in the storage device or file server 224 coupled to or comprised in the mainframe computer system 220.

The enterprise 200 may also comprise one or more computer systems which are connected to the enterprise 200 through the WAN 202: as illustrated, a workstation 210b and a personal computer 212b. In other words, the enterprise 200 may optionally include one or more computer systems which are not coupled to the enterprise 200 through a LAN 204. For example, the enterprise 200 may include computer systems which are geographically remote and connected to the enterprise 200 through the Internet.

As will be described in further detail below, in one embodiment at least one computer system 100 of the enterprise 200 implements a system and method for combining disparate database utilities with a common, unified graphical user interface (GUI) in an improved management console. In a further embodiment, the computer system 100 implements a system and method for providing a utility proxy between a management console and one or more database utilities.

In one embodiment, the management console is implemented using an industry-standard framework such as the MICROSOFT Management Console (MMC). MMC is an industry-standard framework for management applications. MMC does not itself provide any management behavior. Rather, MMC provides a common environment or framework for snap-ins: modules which provide management functionality. Multiple snap-ins can be combined to build a custom management tool. Snap-ins allow a system administrator to extend and customize the console to meet specific management objectives.

In addition to the console application, MMC also provides programmatic interfaces. The MMC programmatic interfaces permit the snap-ins to integrate with the console. In other words, snap-ins are created by developers in accordance with the programmatic interfaces specified by MMC. The interfaces do not dictate how the snap-ins perform tasks, but rather how the snap-ins interact with the console.

MMC has the ability to host any number of different snap-ins. MMC provides the architecture for component integration and allows independently developed snap-ins to extend one another. Snap-ins which do not require additional snap-ins to function are called stand-alone snap-ins. Stand-alone snap-ins provide management functionality even as the sole snap-in in a management console. Extension snap-ins, on the other hand, provide functionality only when invoked by a parent snap-in. The parent snap-in may be a stand-alone snap-in or another extension snap-in. An extension snap-in can extend only given node types. A node is any manageable object, task, or view. The extension snap-in declares itself as being a subordinate to nodes of certain types; then, for each occurrence of those node types in the console, the console will add the related extension snap-in below those nodes automatically. Once the extension registers with the management console, it exposes its functionality to the user as if it were an integral part of the original snap-in. A snap-in may support both stand-alone and extension modes.

In a preferred embodiment, MMC relies heavily on the industry-standard Component Object Model (COM) to allow for component integration. COM is a specification for reusable software components. As COM components, MMC snap-ins are binary components without hard-link dependencies. Therefore, one developer can easily develop an extension to a snap-in developed by another developer without any form of compile or link dependencies. In a further embodiment, snap-ins are implemented in accordance with Distributed COM (DCOM), an extension of COM.

Figure 4:
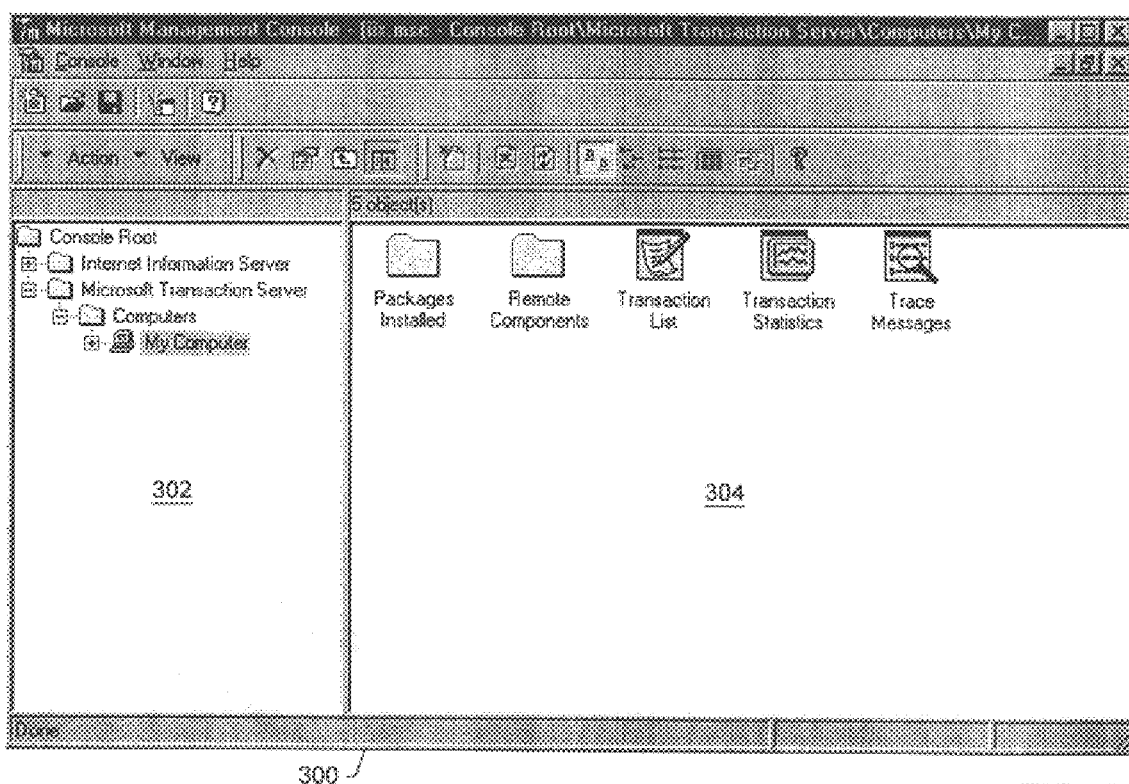
FIG. 4 illustrates the user interface of a management console according to one embodiment.

FIG. 4—An Example Management Console

FIG. 4 illustrates an example of the user interface of a management console 300 in one embodiment. In one embodiment, the console 300 supplies a scope pane 302 and a result pane 304. The scope pane 302 is a window or part of a window which comprises a hierarchical view of manageable nodes, objects, and options that are available to the console user. For example, in one embodiment, the look and feel of the scope pane 302 is that of a tree view that allows the console user to "drill down" or navigate through a hierarchy of items relating to database management systems such as hosts, database instances, databases, object types, and objects. In one embodiment, the console 300 supplies only a root node to a hierarchy or tree of objects and/or functions available to the user. The root node is displayed in the hierarchy of nodes in the scope pane 302. Snap-ins then provide additional nodes as children of the root node.

The result pane 304 is a window or part of a window which displays one or more types of information as a result of the user selecting an item in the scope pane 302. For example, the result pane 304 may display a list of elements or administrative options, a task pad, or an ACTIVEX control. A task pad is a user-friendly interface that is designed to guide a novice user through one or more administrative tasks. In other words, the result pane 304 is configurable to display a feature-rich user interface for one or more objects or functions.

In one embodiment, the management console is further implemented using a superset of MMC such as the BMC Management Console (BMCMC), also referred to as the BMC Integrated Console or BMC Integration Console (BMCIC). In one embodiment, BMCMC is an expansion of MMC: in other words, BMCMC implements all the interfaces of MMC, plus additional interfaces or other elements for additional functionality. Therefore, snap-ins developed for MMC will typically function with BMCMC in much the same way that they function with MMC. The management console may be implemented using any other suitable standard.

In a preferred embodiment, MMC snap-ins are implemented as reusable software components. As described above, MMC snap-ins may be implemented according to the industry-standard Component Object Model (COM) or Distributed Component Object Model (DCOM) for reusable software components. BMCMC, as a superset to MMC, looks similar to and supports all of MMC 1.0 COM interfaces, plus additional interfaces allowing for enhanced features.

Figure 5A:
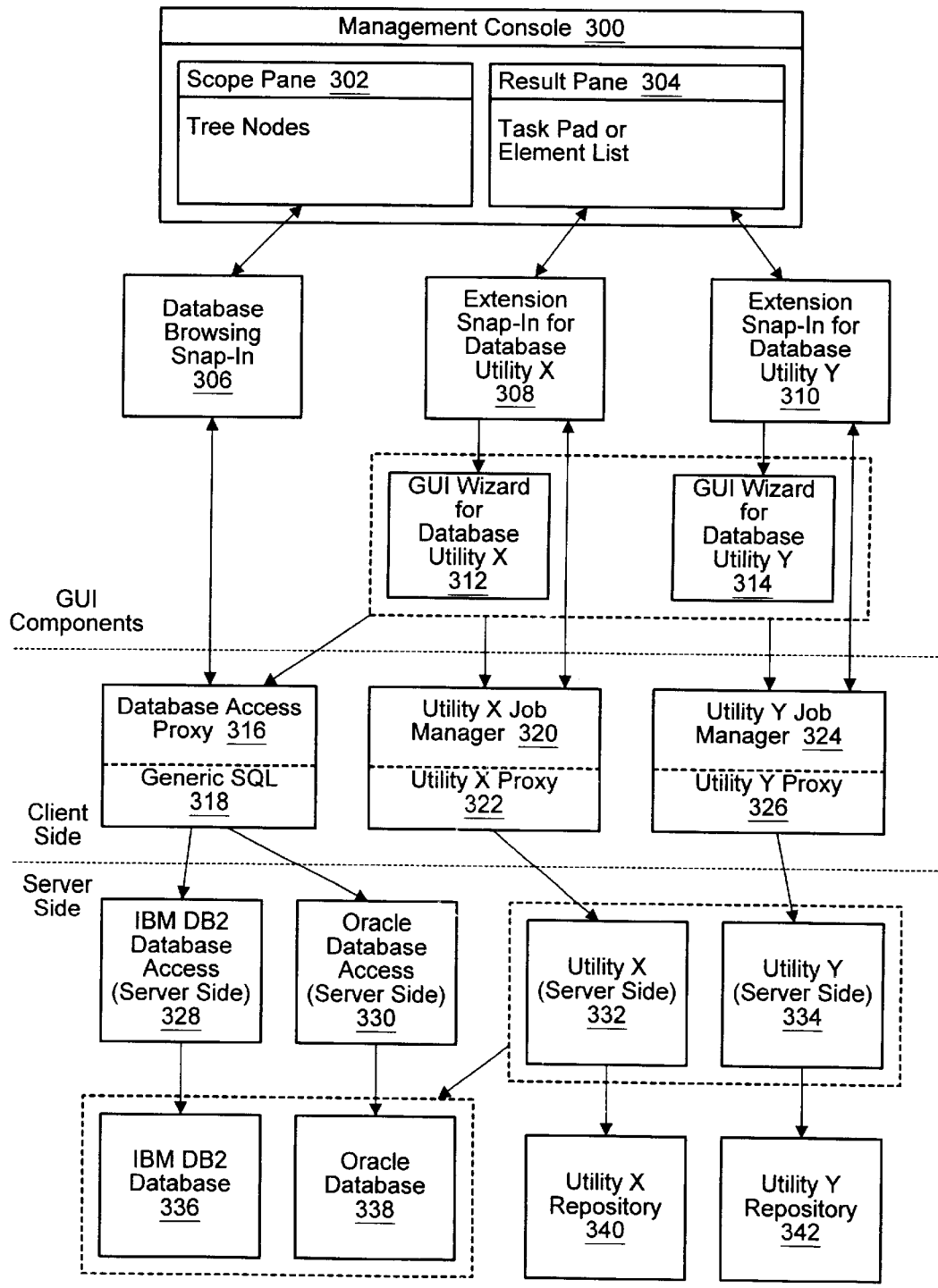
FIG. 5a illustrates a client/server architecture according to one embodiment.

FIG. 5a—Software Component Hierarchy

FIG. 5a is a software block diagram illustrating the various software components that may reside in the enterprise computing environment 200. More specifically, FIG. 5a illustrates the manner in which the management console 300 and the various snap-ins 306–310 interface to various disparate databases. As described above, the management console 300 includes a scope pane 302, with a tree of nodes, and a result pane 304, typically with a task pad or element list. In a preferred embodiment, the improved management console includes a primary snap-in and a plurality of extension snap-ins. The primary snap-in may be an object browser 306 which provides database browsing functionality. The database browser snap-in 306 is responsible for database object discovery and for allowing the console user to easily navigate through multiple heterogeneous DBMS hosts and environments. The database browser snap-in 306 is also responsible for allowing the console user to select database objects in the scope pane 302 and perform a variety of operations on them. Thus, the database browser snap-in 306 provides additional nodes to the scope pane 302.

In various embodiments, database browsing entails displaying names and/or contents of tablespaces, tables, records, meta-data, and any other suitable information concerning one or more database management systems. In one embodiment, the database browser 306 displays the information in a hierarchical format: for example, tables are listed under the appropriate tablespace, and tablespaces are listed under the appropriate database management system. The console user can "drill down" or descend to a desired level in the hierarchy of database objects. In various embodiments, supported database management systems include one or more of the following: "ORACLE," "SQL SERVER," "SYBASE," "INFORMIX," and any other suitable database management system. In one embodiment, the database browser 306 is implemented as an MMC snap-in component. Therefore, it is implemented with the necessary COM interfaces required by the MMC console and, optionally, with additional interfaces to provide configuration and customization.

In one embodiment, extension snap-ins provide additional functionality to the primary snap-in. In other words, an extension snap-in is linked to the primary snap-in and is said to extend the primary snap-in. Extension snap-ins may also be configurable to extend other extension snap-ins. In one embodiment, the database browsing snap-in can be used anywhere in the hierarchy of snap-ins: either as a primary snap-in, as described above, or as an extension snap-in for a different primary snap-in.

For purposes of example, FIG. 5a shows two extension snap-ins: an extension snap-in for database utility X 308 and an extension snap-in for database utility Y 310. However, any reasonable number of extension snap-ins may be linked to the primary snap-in. In one embodiment, each extension snap-in provides access to a particular database utility. In FIG. 5a, for example, the database utility X extension snap-in 308 provides access to database utility X 332, and the database utility Y extension snap-in 310 provides access to database utility Y 334. Extension snap-ins extend the database browser 306 by exposing their own functionality in the form of "tasks" that the console user can invoke on the selected database objects. For example, database utility X 332 or database utility Y snap-in 334 could perform defragmentation functions for one or more particular database management systems. In this example, the defragmentation utility snap-in would register itself as extending all nodes of type "tablespace" owned by the database browser snap-in 306. The user interface for selecting and performing a defragmentation task is described in greater detail below with reference to FIGS. 6 through 24.

In this way, the functionality of the database browser 306 is effectively extended by independent binary components, the extension snap-ins, with the appearance to the console user of a single, integrated user interface. Like the primary snap-in, the extension snap-ins are also implemented with the required MMC interfaces in one embodiment. In addition, extension snap-ins typically implement the IExtendContextMenu interface to expose their functionality to the user in the form of actions that can be selected from a contextual menu that relates to the objects they wish to extend.

Each database utility snap-in may have an associated GUI wizard. As illustrated in FIG. 5a, the utility X snap-in 308 is linked to or associated with a GUI wizard 312, and the utility Y snap-in 310 is linked to or associated with a GUI wizard 314. As used herein, a wizard or GUI wizard is a software component that provides a user interface for accessing the functions of a utility. A GUI wizard may be launched from the management console. A GUI wizard can assist the management console in at least two respects: execution confirmation and step-by-step guidance of the console user through the process of executing tasks associated with a utility. A GUI wizard typically comprises at least one dialog box, window, or other suitable means of obtaining user input. For example, a GUI wizard for a defragmentation utility might prompt the user for parameters specific to the defragmentation job in question.

Figure 5B:
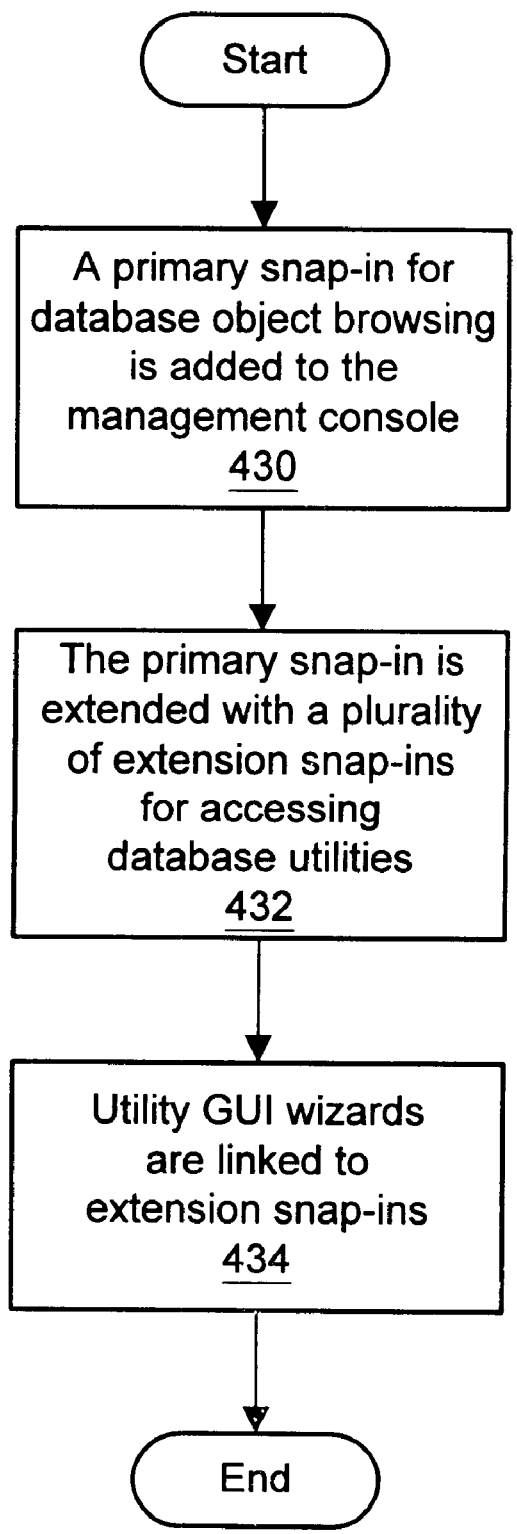
FIG. 5b is a flowchart which illustrates the implementation and/or configuration of the management console according to one embodiment.

FIG. 5b—Implementation of the Management Console

FIG. 5b is a flowchart which illustrates the implementation and/or configuration of the improved management console according to one embodiment. In step 430 a primary snap-in for database object browsing is added to the management console by a console administrator. In step 432 the primary snap-in is extended with a plurality of extension snap-ins for accessing database utilities. By adding an extension snap-in to the primary snap-in according to the MMC standard, the console administrator extends the primary snap-in and therefore configures the management console with the functionality of a database utility. In step 434 GUI wizards are linked to the extension snap-ins. In one embodiment, a GUI wizard is linked to an extension snap-in by programming the extension snap-in to launch the GUI wizard through a COM interface exposed by the GUI wizard. The COM interface of a GUI wizard is set forth in more detail below.

A utility's wizard can be utilized by the console user under two different approaches. First, a utility's wizard can be displayed to confirm execution of a utility when the console user performs a task on an object. In other words, the console user first selects an object and then selects from a list of tasks available for that object. This first approach is called "object-to-task." Second, the wizard can lead a console user through the process after the user selects a particular task. In other words, the console user first selects a task and then selects from a list of objects available for that task. This second approach is called "task-to-object." Whether a user picks a "task-to-object" or "object-to-task" approach, the use of a single GUI wizard per extension snap-in ensures that the user is presented with the same user interface elements and that the same results are obtained.

FIGS. 6 through 16—Task-to-Object Approach

Figure 6:
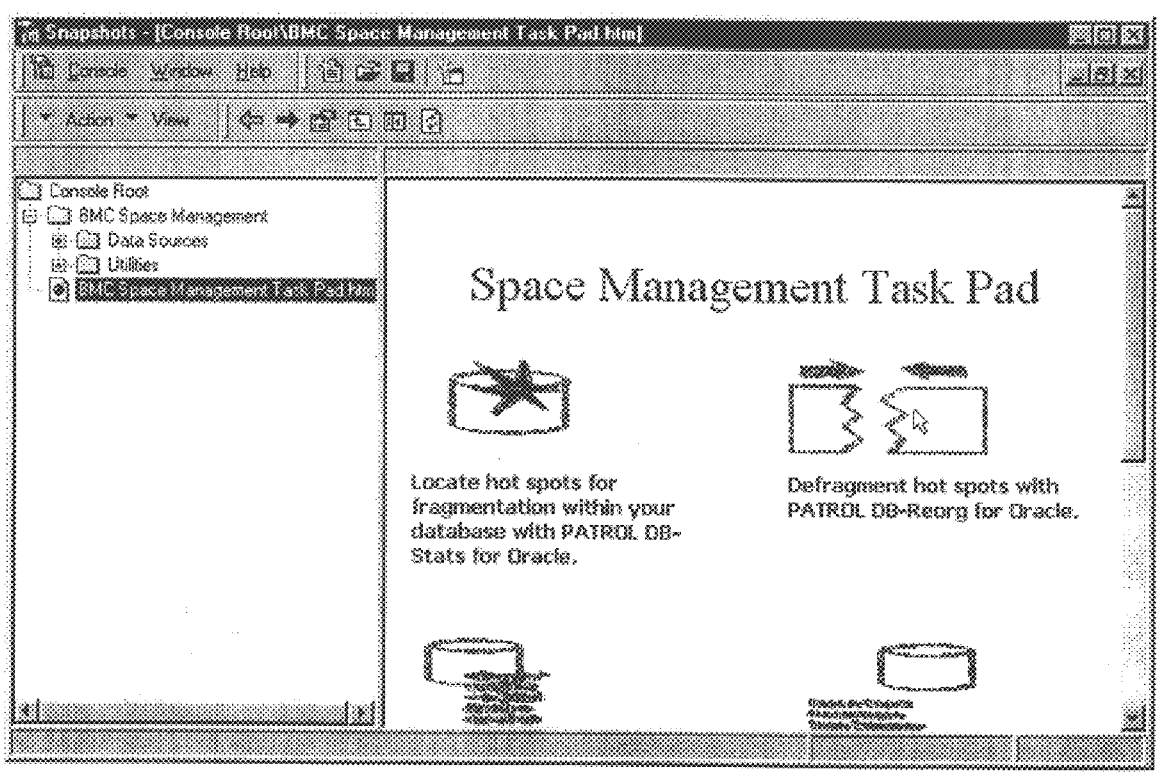
FIGS. 6 through 16 are screen shots illustrating a task-to-object approach of utilizing the management console according to one embodiment.
Figure 7:
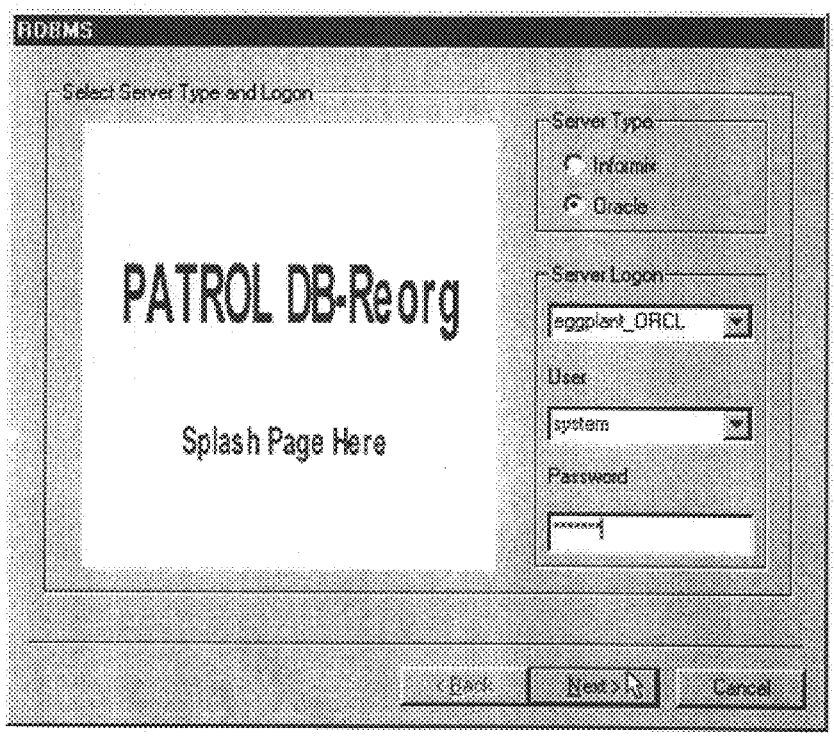
Figure 8:
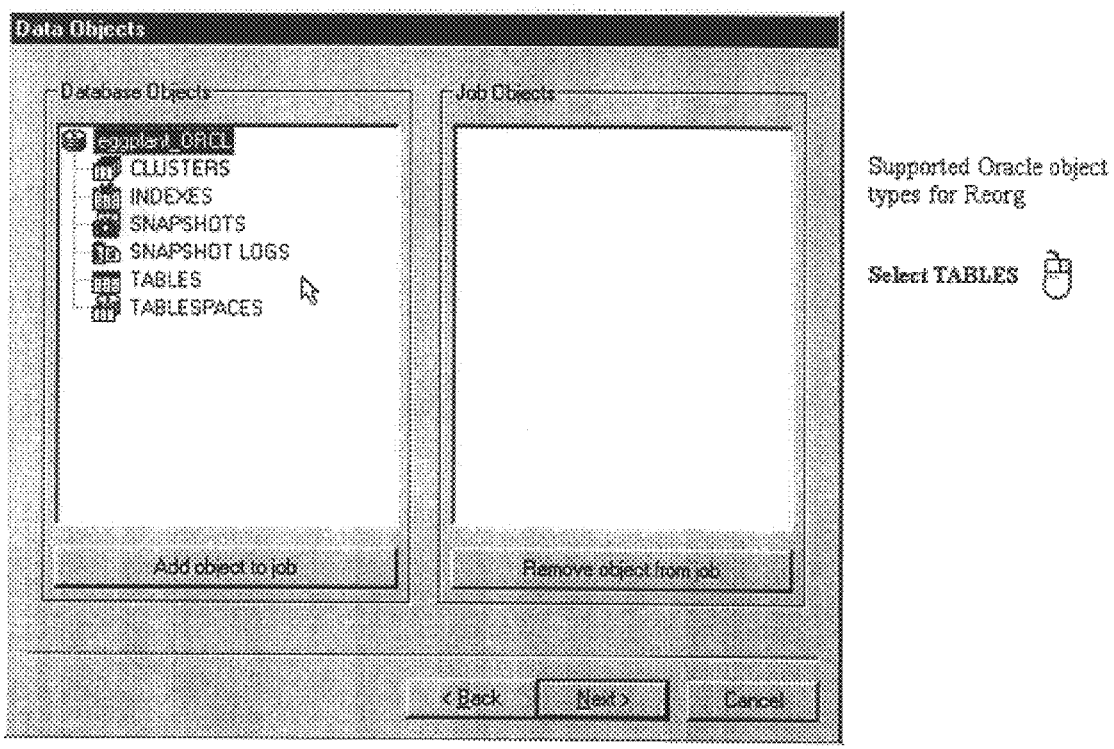
Figure 9:
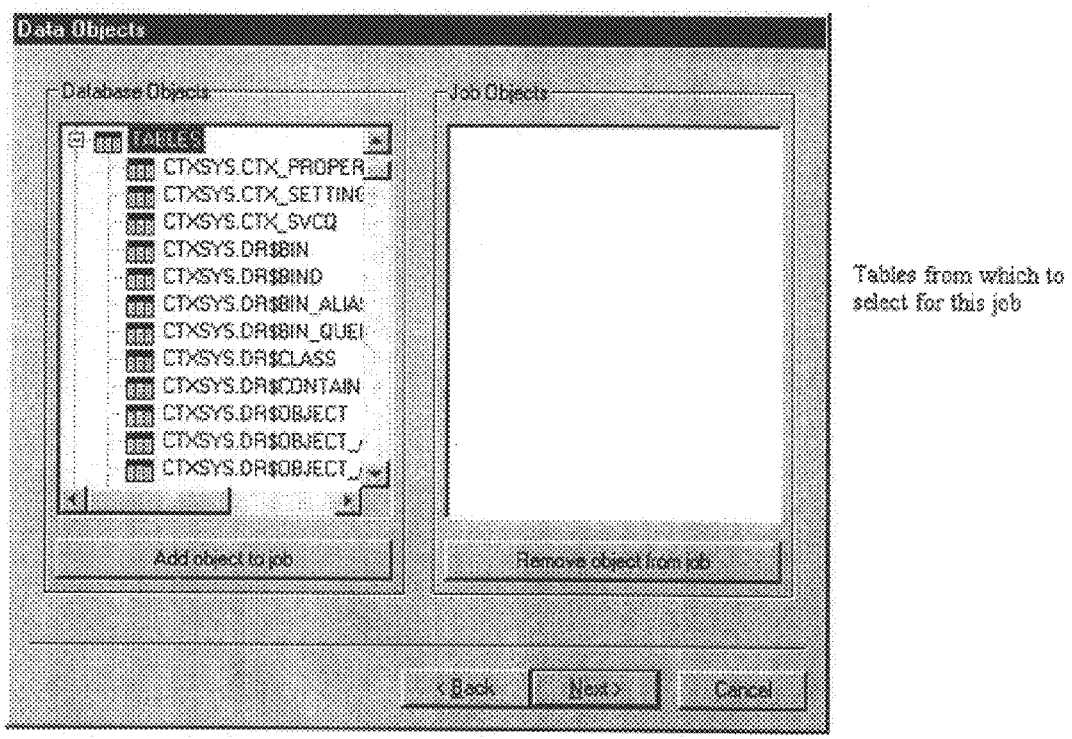

FIGS. 6 through 16 illustrate an example of the "task-to-object" approach. FIG. 6 shows a typical management console. The user has selected an object named "BMC Space Management Task Pad.htm" in the scope pane. As a consequence, the result pane shows a Space Management Task Pad. When the user clicks on the "defragment" icon in the task pad, then a PATROL DB-Reorg GUI wizard, as illustrated in FIG. 7, is shown to the console user. The GUI wizard shows two supported relational database management systems (RDBMSs), INFORMIX and ORACLE, the latter of which the user has chosen, along with selections from a server and user list. When the user enters a password and clicks the "Next" button, a Data Objects window is shown, as illustrated in FIG. 8. The Data Objects window shows supported Oracle object types for the Reorg task. When the user double-clicks the "TABLES" object type, then "TABLES" is opened and a list of tables is shown, as illustrated in FIG. 9.

Figure 10:
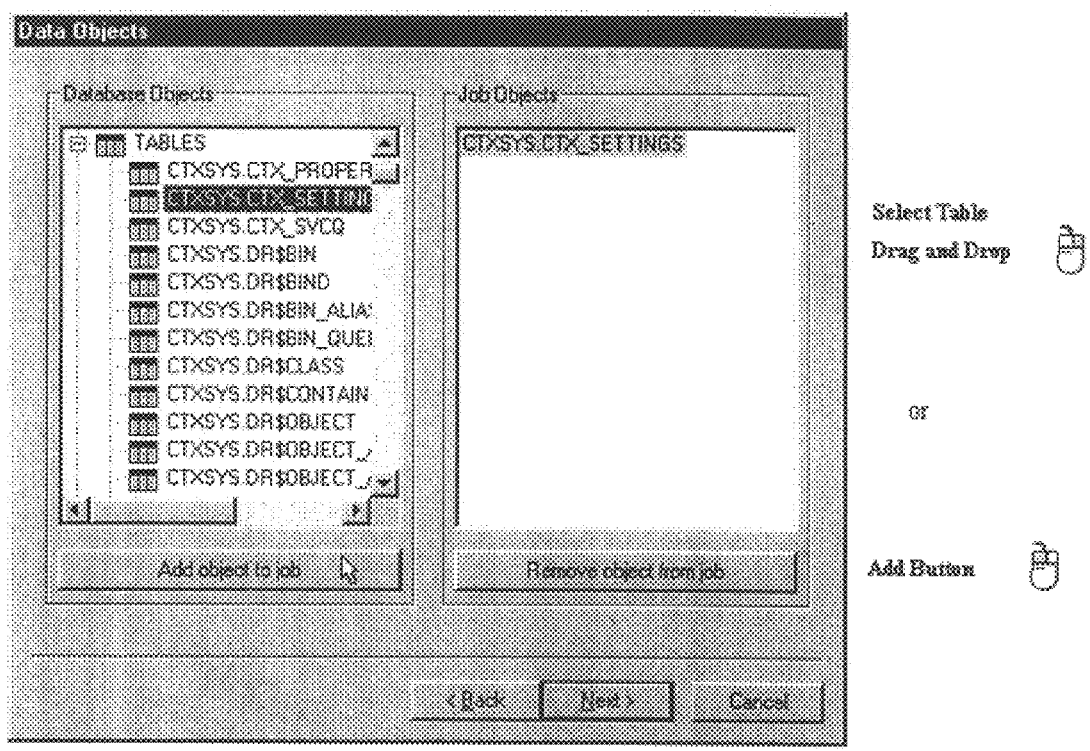
Figure 11:
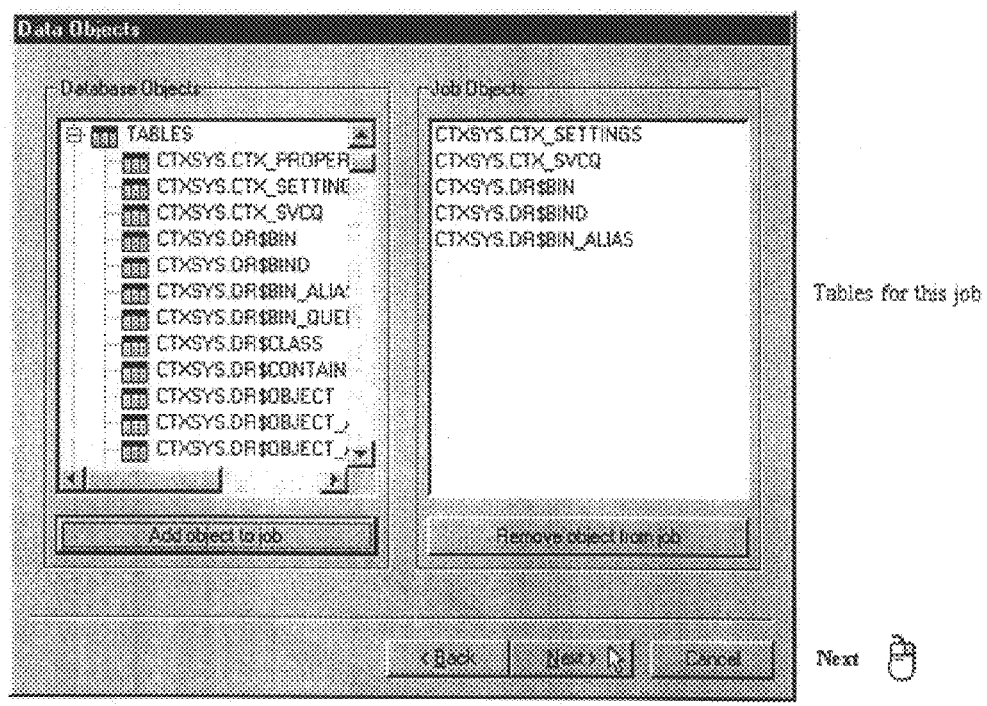
Figure 12:
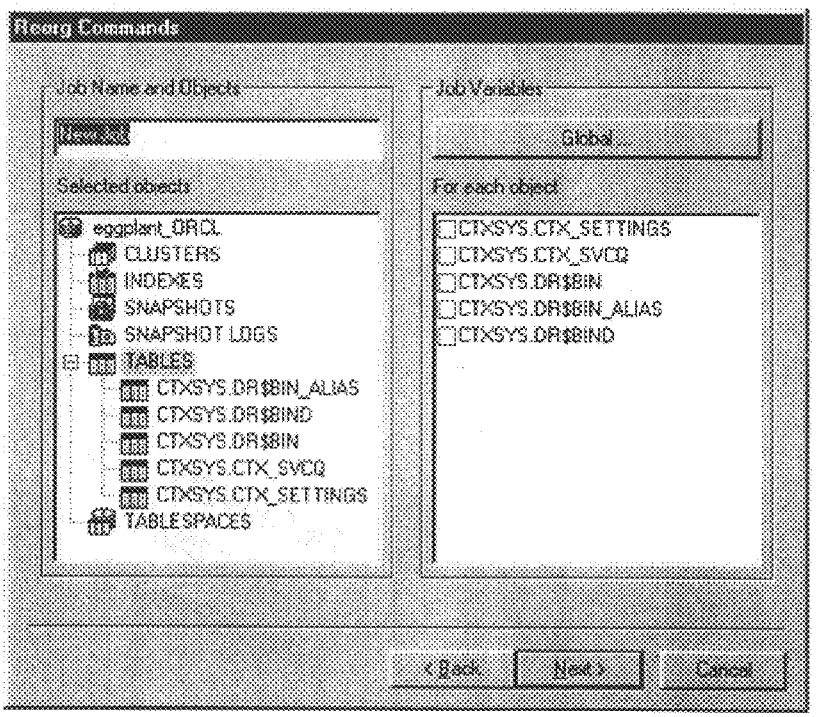
Figure 13:
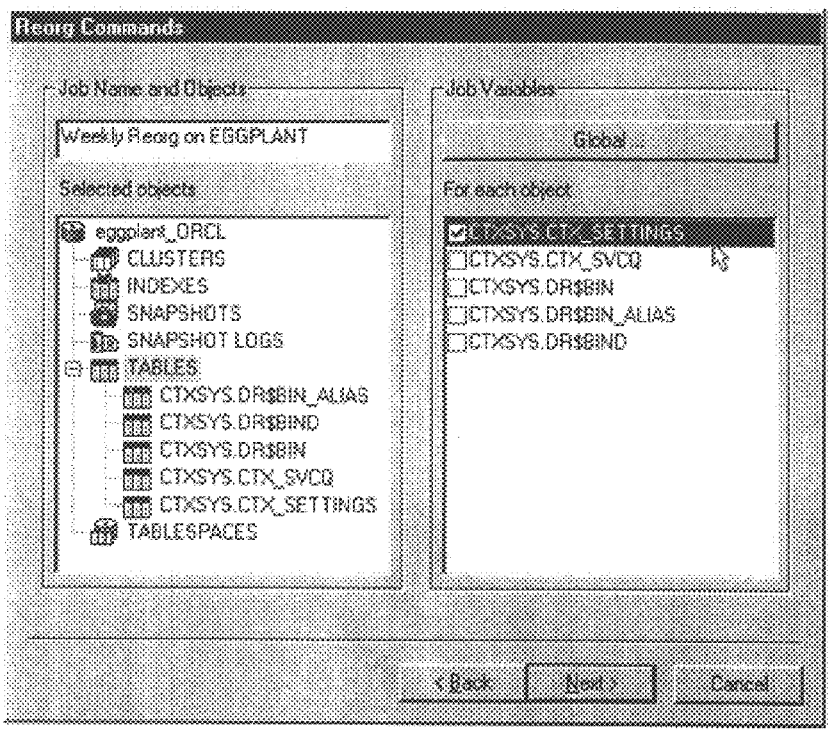
Figure 14:
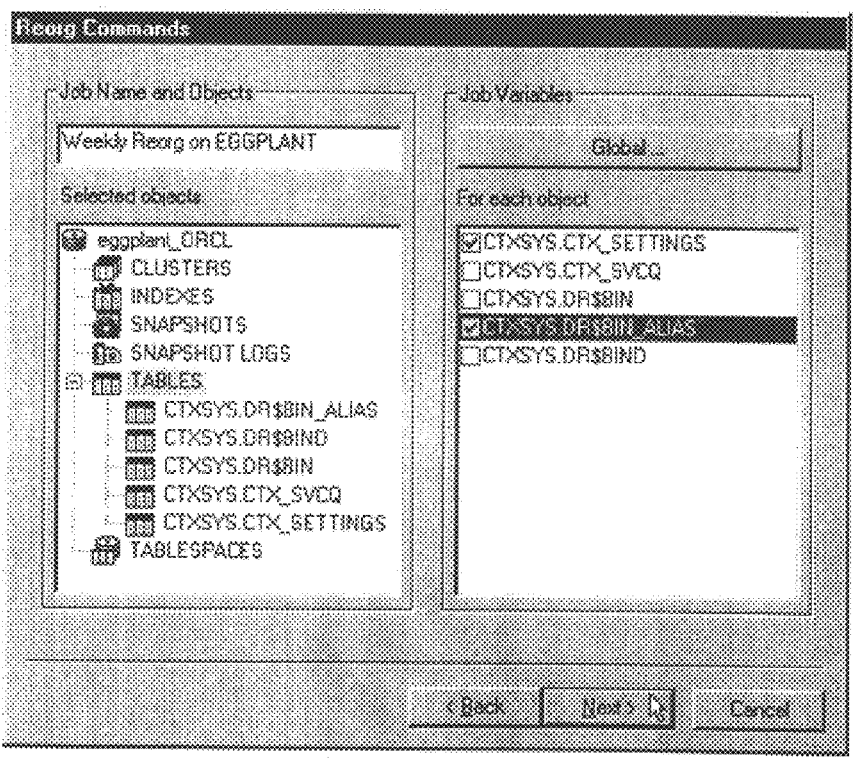
Figure 15:
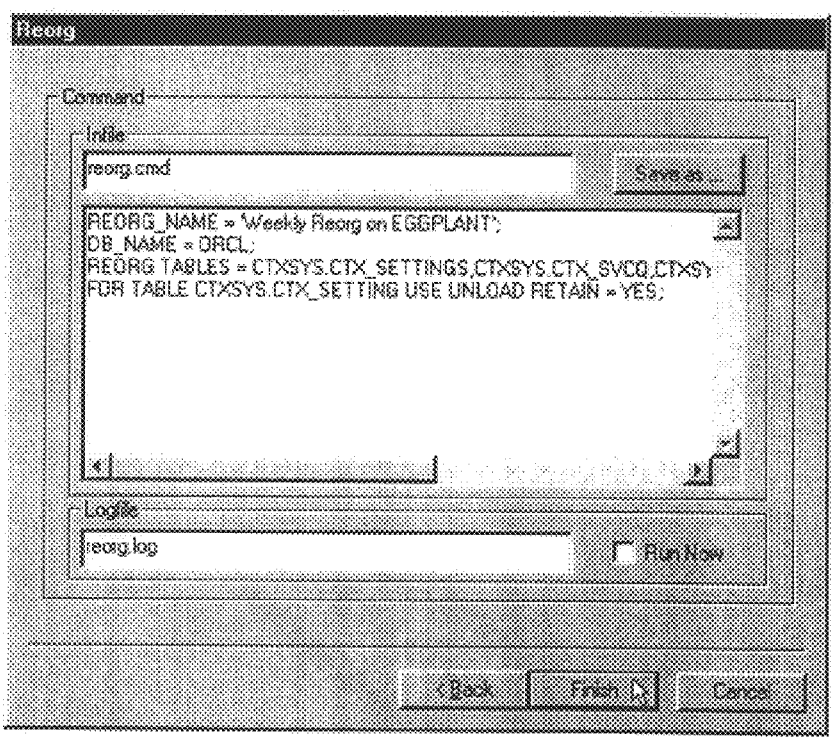
Figure 16:
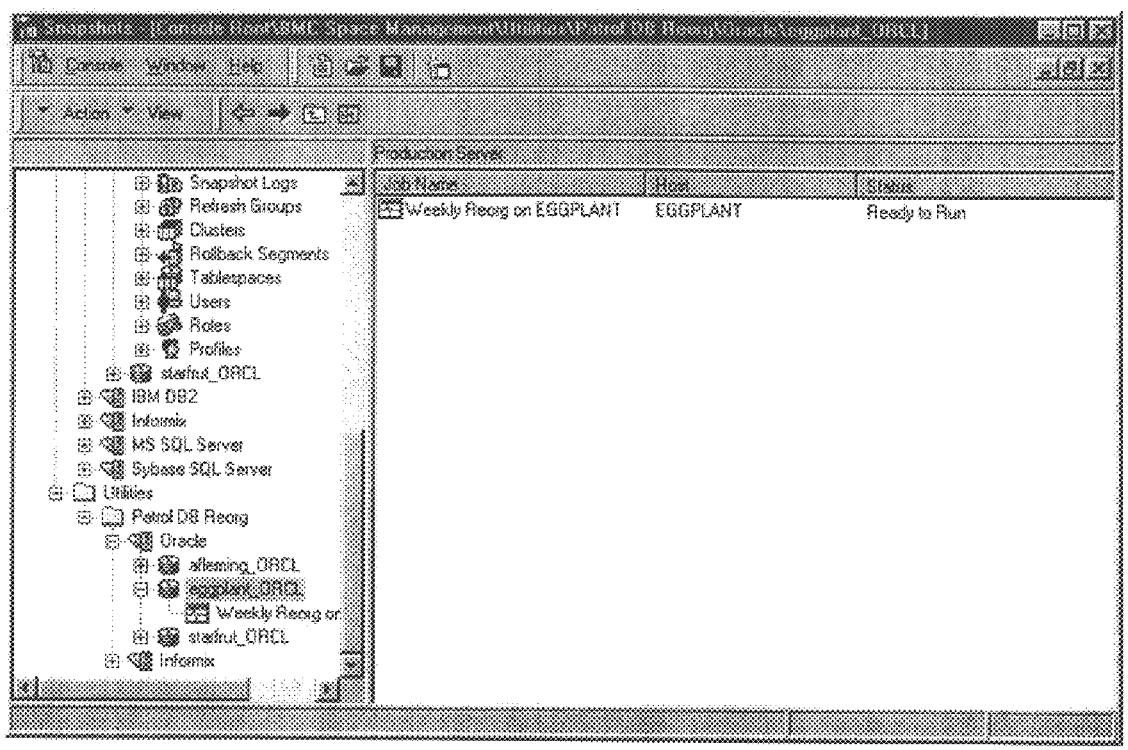

In FIG. 9, the user can add a table to the list of job objects in two ways: by dragging a table name to the job objects list and dropping the table name on the hob objects list, or by highlighting a table name and then clicking the "Add object to job" button. In FIG. 10, the user has selected the table "CTXSYS.CTX_SETTINGS" through one of the two selection methods. FIG. 11 shows that the user has selected additional tables for the job. When the user clicks the "Next" button, then in FIG. 12 the job name and variables can be edited. In FIG. 13, job variables are assigned to each table object. A property sheet containing global variables can be accessed by clicking on the "Global . . . " button. A set of property pages for an individual object can be accessed by checking the box for or selecting the name of the object. FIG. 14 illustrates the three states available for each object: enabled (checked), disabled (grayed out), or variables not defined for this object. FIG. 15 displays the name and contents of the task's infile as well as the task's logfile. If the "Run Now" checkbox is checked, then the task will be run when the user clicks the "Finish" button. In FIG. 16, the defragmentation job is shown as "ready to run."

FIGS. 17 through 24—Object-to-Task Approach

Figure 17:
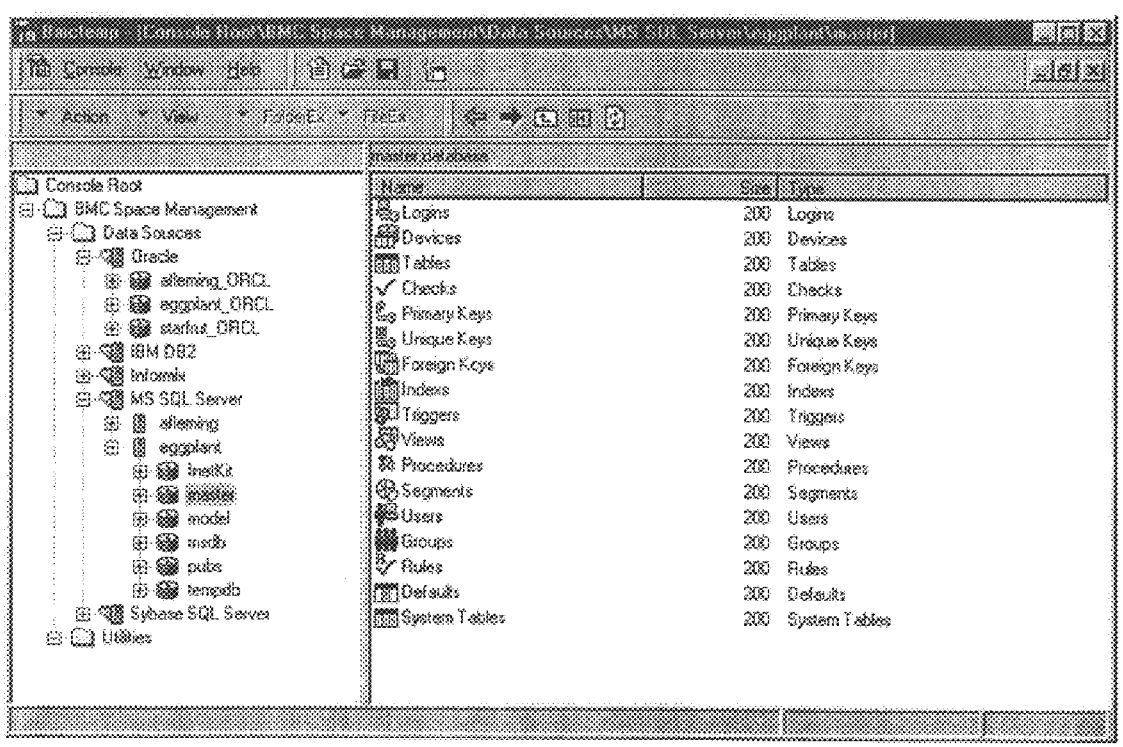
FIGS. 17 through 24 are screen shots illustrating an object-to-task approach of utilizing the management console according to one embodiment.
Figure 18:
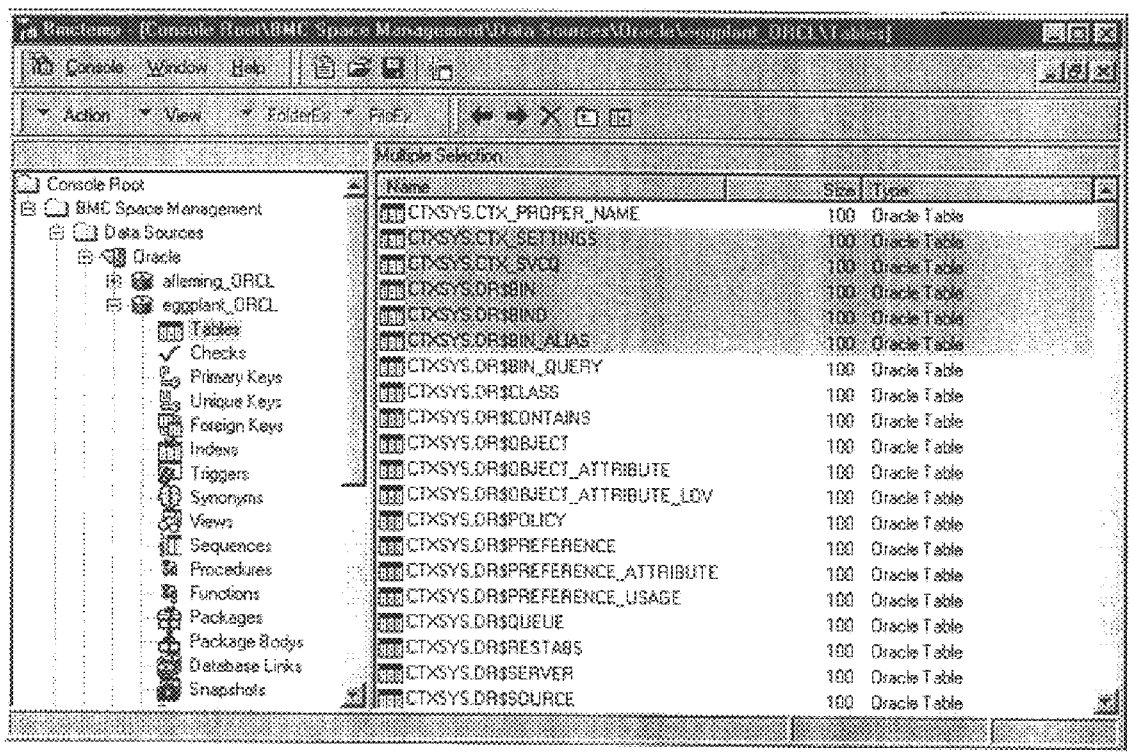

FIGS. 17 through 24 illustrate an example of the "object-to-task" approach. The database browser snap-in allows the user to navigate through a database hierarchy, and, if extensions are available, invoke their functionality seamlessly through one common user interface. FIG. 17 shows a typical management console. In the scope pane, the user has selected the "master" database on the "eggplant" computer system, which is running MICROSOFT SQL Server DBMS software. In the result pane, objects from the master database are listed. FIG. 18 shows that the user has "drilled down" into the "Tables" object under the ORACLE database "eggplant," and a list of available tables is displayed. FIG. 18 further shows that the user has selected five tables.

Figure 19:
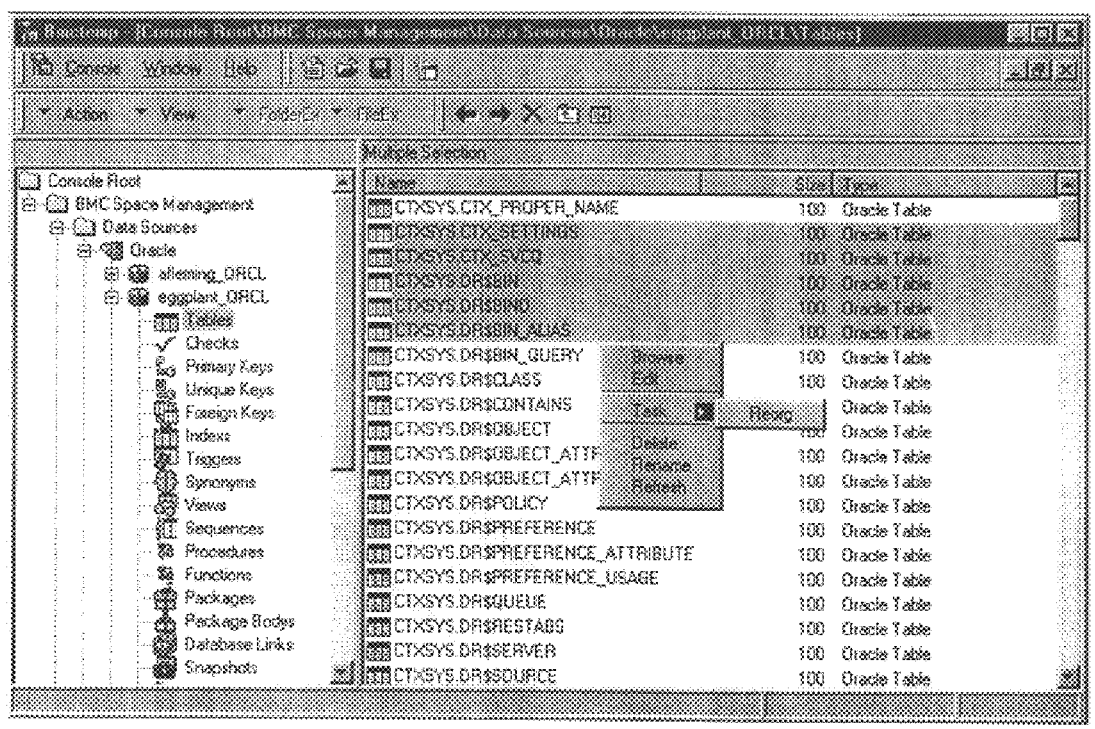
Figure 20:
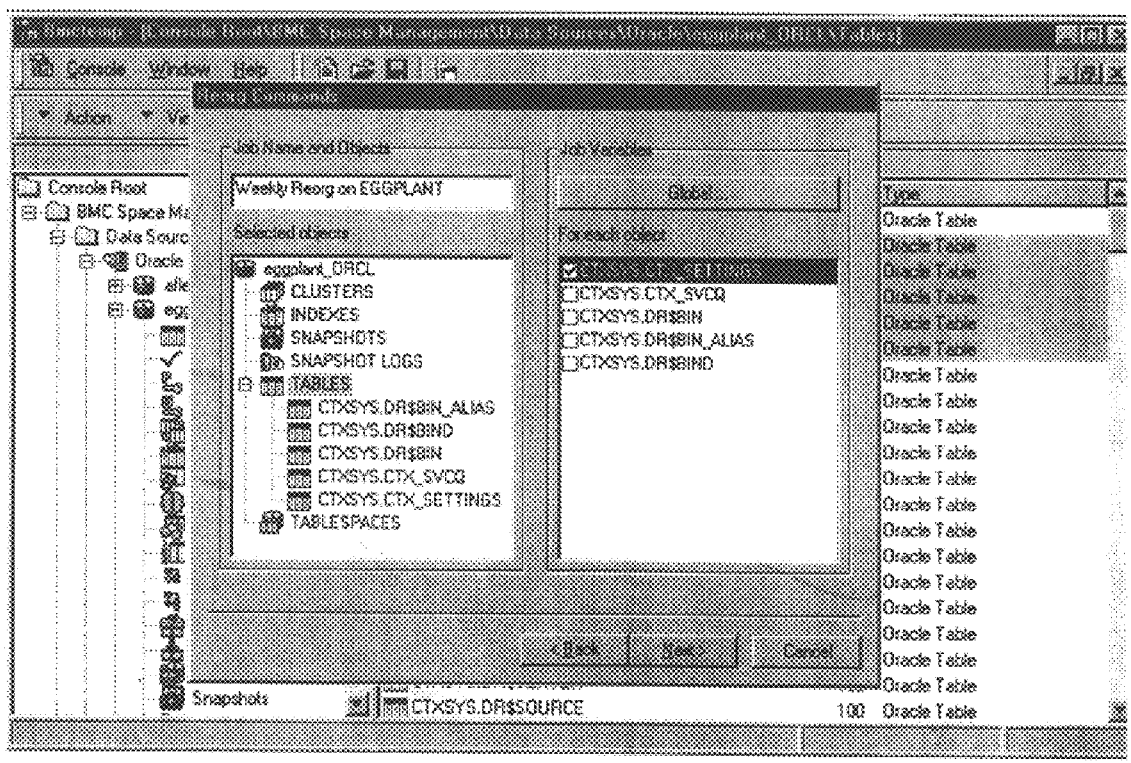
Figure 21:
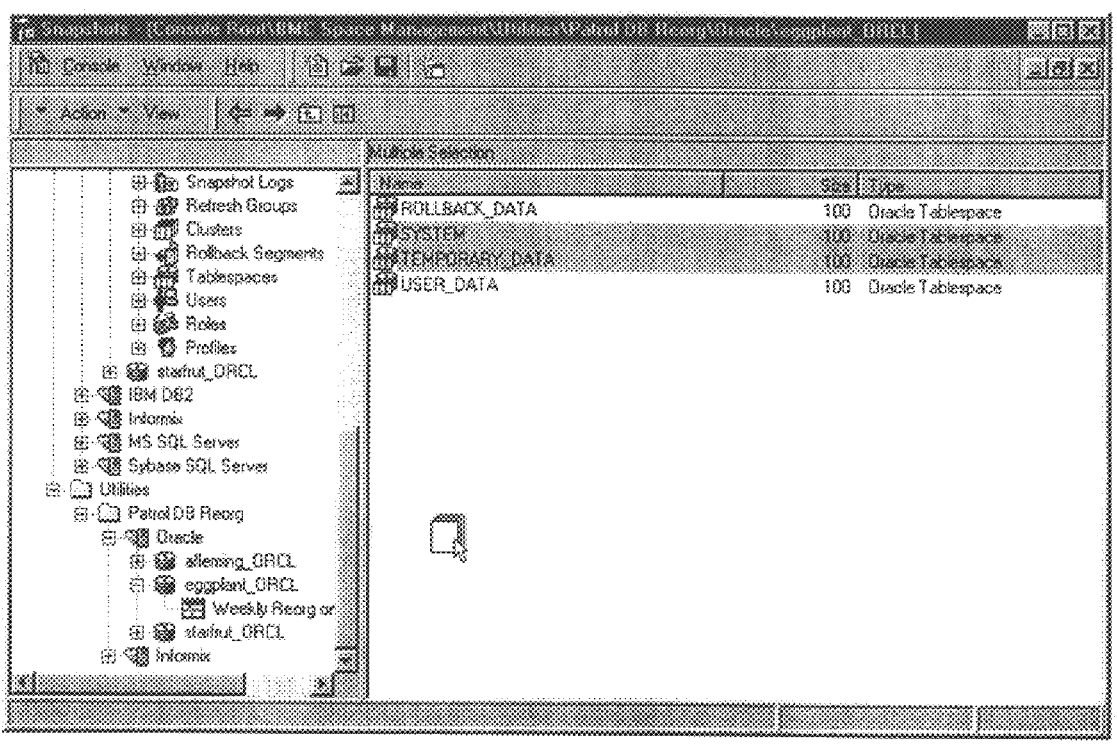
Figure 22:
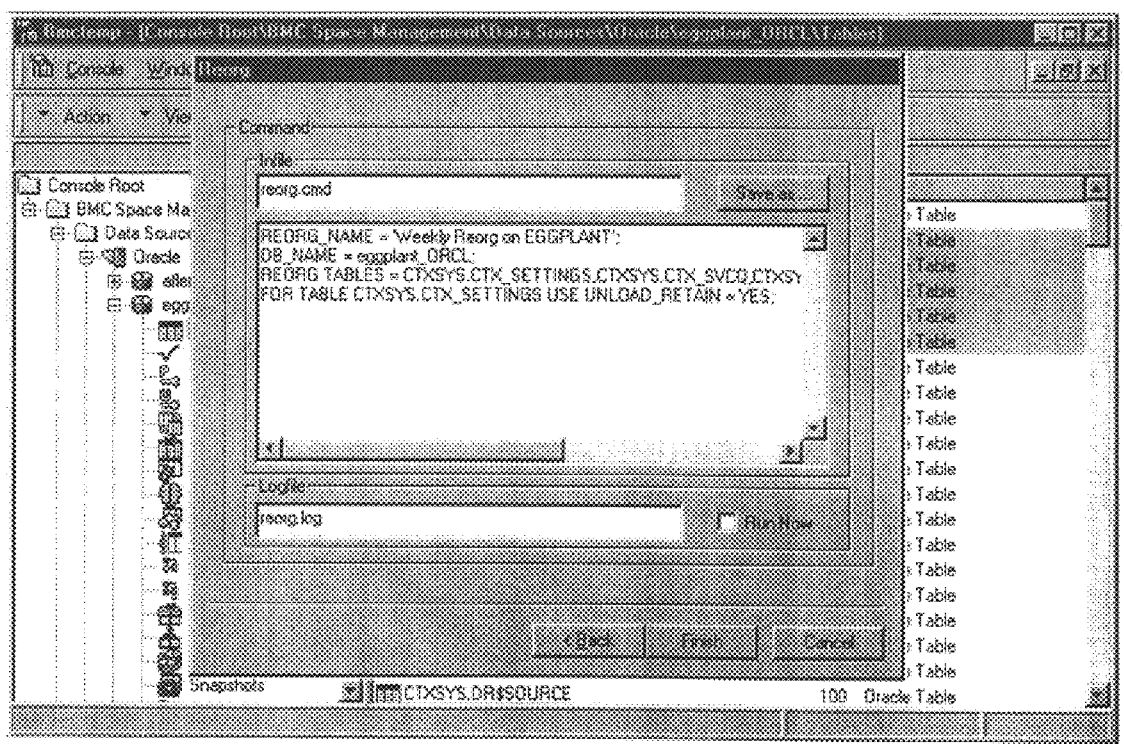
Figure 23:
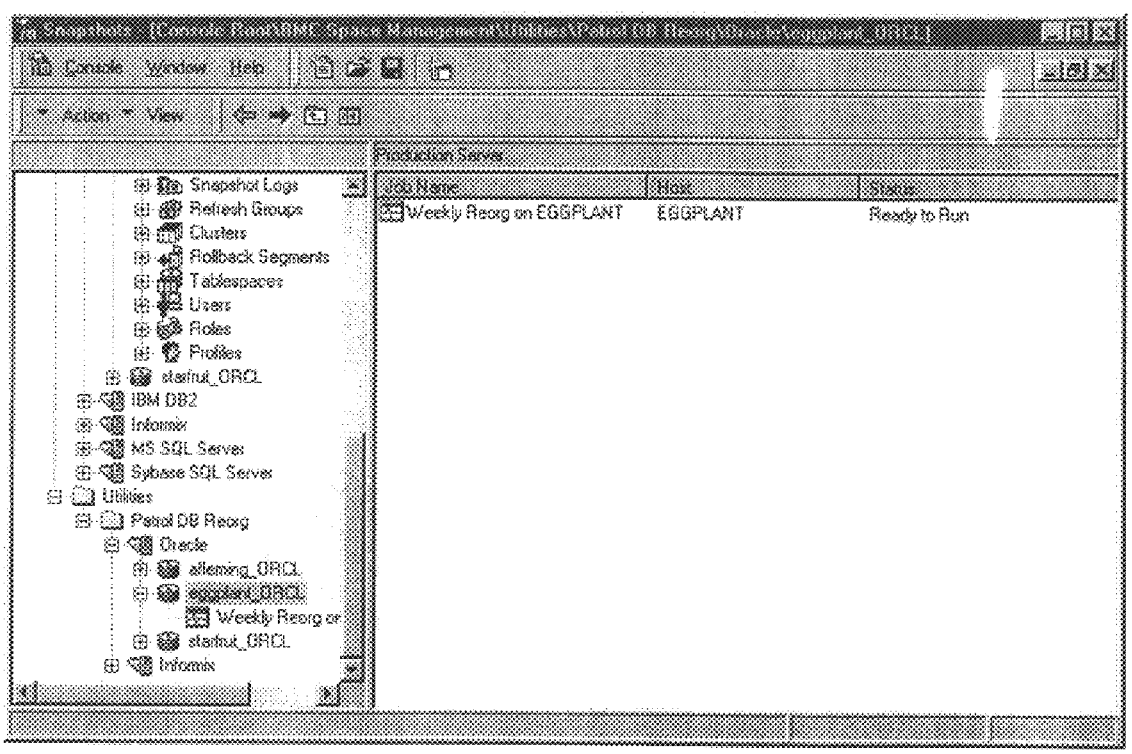
Figure 24:
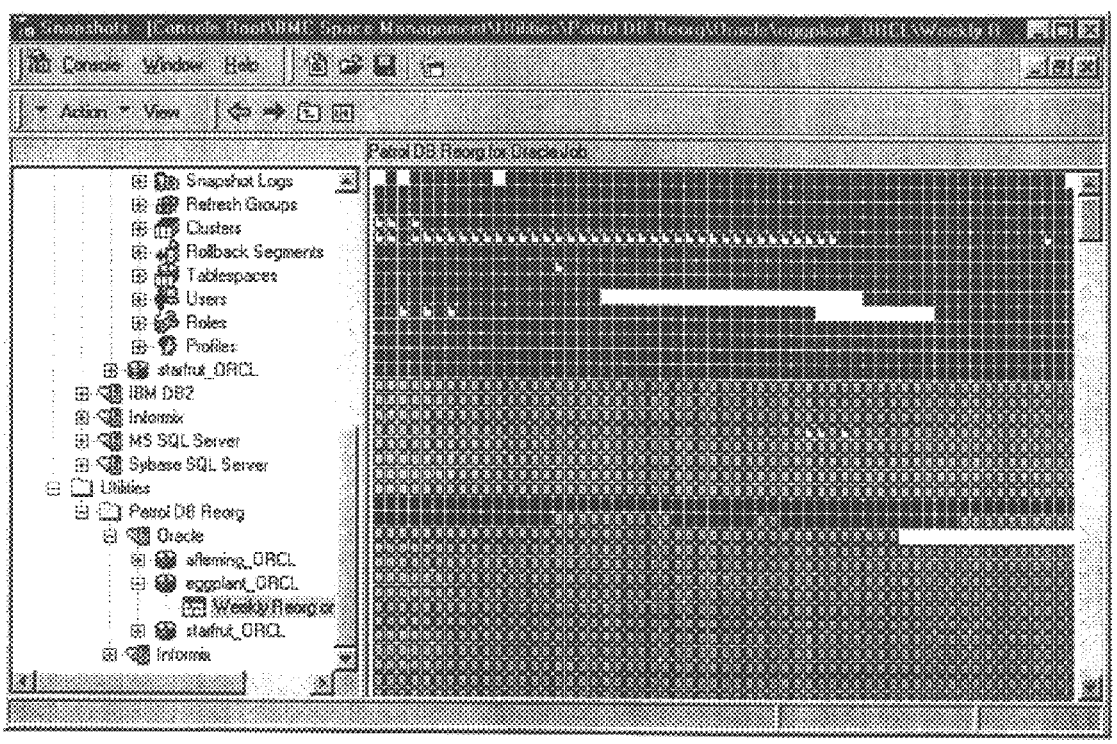

Once an extension snap-in has been added to the primary snap-in, its functionality becomes available to the user. An extension snap-in may select the exact kind of objects on which it operates. FIG. 19 illustrates an extension snap-in named Reorg that has registered itself as providing a contextual task for Oracle Tables. Thus, when the user right-clicks on the selected tables, a contextual menu is displayed which includes "Reorg" under a "Task" sub-menu. When the user selects the "Reorg" task, then in FIG. 20 the Reorg GUI wizard is shown to allow the user to create a new Reorg job. The GUI wizard is the same wizard discussed with reference to the "task-to-object" approach shown in FIGS. 6 through 16. Therefore, in the same way previously described, the user can use the GUI wizard to accept the default options or configure the options in creating a job definition. The user may then repeat the steps shown in FIGS. 19 and 20 as many times as desired to append additional objects to the Reorg job. Alternatively, as shown in FIG. 21, the user may highlight different objects and use drag-and-drop to add the objects to the job definition shown in the hierarchy in the scope pane. As illustrated in FIG. 22, the user has the option to run the job immediately or leave the job in a "ready to run" state for later execution via the console. FIG. 23 shows the job in a "ready to run" state. FIG. 24 shows a dynamic defragmentation-like display in the result pane which is displayed while the Reorg job is taking place.

In one embodiment, the GUI wizards are COM-based. Furthermore, a GUI wizard preferably exposes a dual COM interface to allow both the associated extension snap-in and task pad to invoke the wizard's functionality. In one embodiment, a wizard is a dual-interfaced, COM-based, in-process server DLL built from one or more property sheets and property pages. A wizard can be written in a variety of programming languages, such as Visual C++, Visual J++, or VISUAL BASIC, as long as the wizard can be invoked from a compiled language or from a scripting language. Furthermore, when a wizard is a COM component, it can be deployed elsewhere in the enterprise, apart from the management console. In other words, the wizard can be launched from applications other than the management console.

The database browser snap-in 306 and utility wizards 312 and 314 may call a database access proxy component 316 to obtain information about the database(s). Most calls are made to obtain the name of data objects by data type, such as the names of tables. Calls may also be made to query other information, such as the database version or host system type. The database access proxy 316 is responsible for providing a facility 318 to execute SQL statements against a particular database and to fetch the resulting set in an efficient manner. In a preferred embodiment, the SQL component 318 has a generic interface that maps to multiple database management systems. As shown in FIG. 5a for purposes of example, the database access proxy 316 is operable to communicate with two server-side database access components: a server-side IBM DB2 database access component 328 for an IBM DB2 database 336, and a server-side ORACLE database access component 330 for an Oracle database 338. As shown in the example in FIG. 5a, the database access components 328 and 330 in turn communicate with the databases 336 and 338, respectively. Of course, a server-side database access component can be implemented for any suitable database management system, and the database access proxy can communicate with a plurality of the server-side database access components and their respective databases. In one embodiment, the database access proxy 316 is implemented in accordance with COM.

In one embodiment, extension snap-ins are also responsible for keeping track of running jobs and their status, and they report this information back to the console user by adding a node under a Utilities node which is provided by the database browser snap-in 306. This extension-provided status node serves as a "task manager" for a particular utility, allowing the console user to view the status of all running jobs across the enterprise, and potentially to perform actions on any of these jobs. For example, some of these actions could be to "pause" and "resume," or "stop" and "purge."

The actual execution of the process or utility, whether local or remote, is handled by a job manager. In FIG. 5a, utility X has a job manager 320 and utility Y has a job manager 324. In one embodiment, the job manager is a COM component server that runs as a Windows™ NT system service. The job manager is responsible for job scheduling, job monitoring, event callbacks, and file transfers. The job manager therefore provides multitasking to a single-threaded GUI environment and to console callback notification. In one embodiment, for database systems running on Windows™ NT, the job manager may reside on the same system as the database. In one embodiment, for database systems running on UNIX, MVS, or other operating systems, a job manager running on Windows™ NT uses a remote execution protocol, such as Rexec, to control jobs running on the remote system.

In a further embodiment, a utility proxy provides remote execution of a particular utility. FIG. 5a shows a utility X proxy 322 for utility X 332 and a utility Y proxy 326 for utility Y 334. Typically, the utility proxy resides on the client side and the utility itself resides on the server side, often coupled to a database management system. In a preferred embodiment, a utility job manager is a COM wrapper around a utility proxy, and therefore the utility proxy provides job management tasks for an instance of a utility. In one embodiment, a utility proxy provides the following methods relating to job management: CreateJob( ), GetJobData( ), UpdateJobData( ), DeleteJob( ), GetJobStatus( ), GetJobHistory( ), GetListOfJobIDs( ), ExecuteJob( ), ScheduleJob( ), PauseJob( ), ResumeJob( ), RestartJob( ), StopJob( ), and CancelJob( ).

Figure 25:
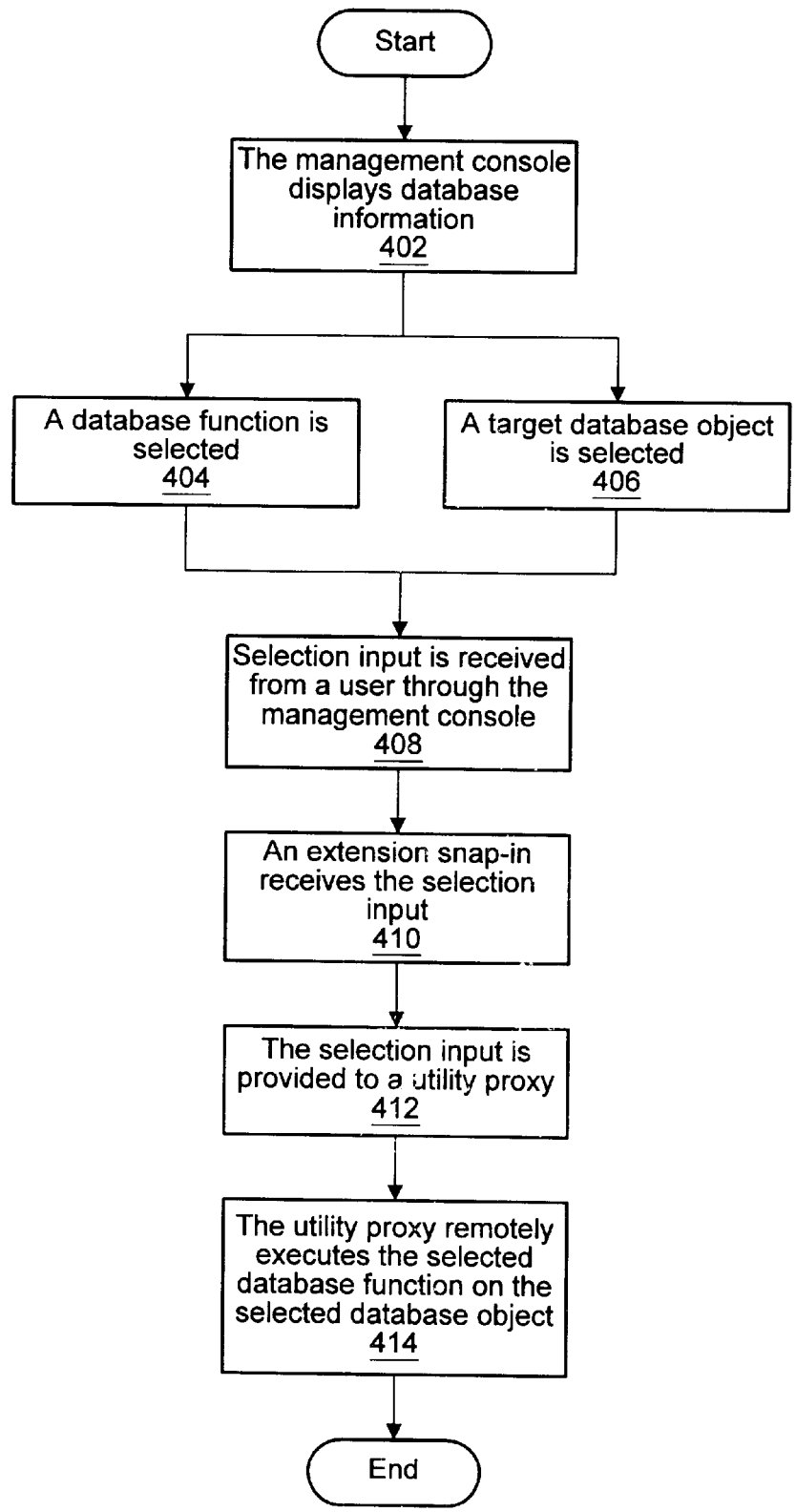
FIG. 25 is a flowchart which illustrates the execution of a database utility through the management console according to one embodiment.

FIG. 25 is a flowchart which illustrates and summarizes the execution of a database utility through the management console according to one embodiment. In step 402 database information is displayed in the management console. In one embodiment, this database information comprises information in a hierarchical format as provided by the database browser snap-in. In step 404, a database function is selected, and in step 406 a target database object is selected from the database information. Step 404 can be performed before step 406 if the task-to-object approach is taken, and step 404 can be performed after step 406 if the object-to-task approach is taken. In step 408 the selection input generated in steps 404 and 406 is received from the user by the management console. In step 410 an appropriate extension snap-in receives the selection input. In step 412 the selection input is provided to a utility proxy. In step 414 the utility proxy remotely executes the selected database function on the selected database object.

FIGS. 26 through 29—Operation of a Utility Proxy

Figures 26, 27:
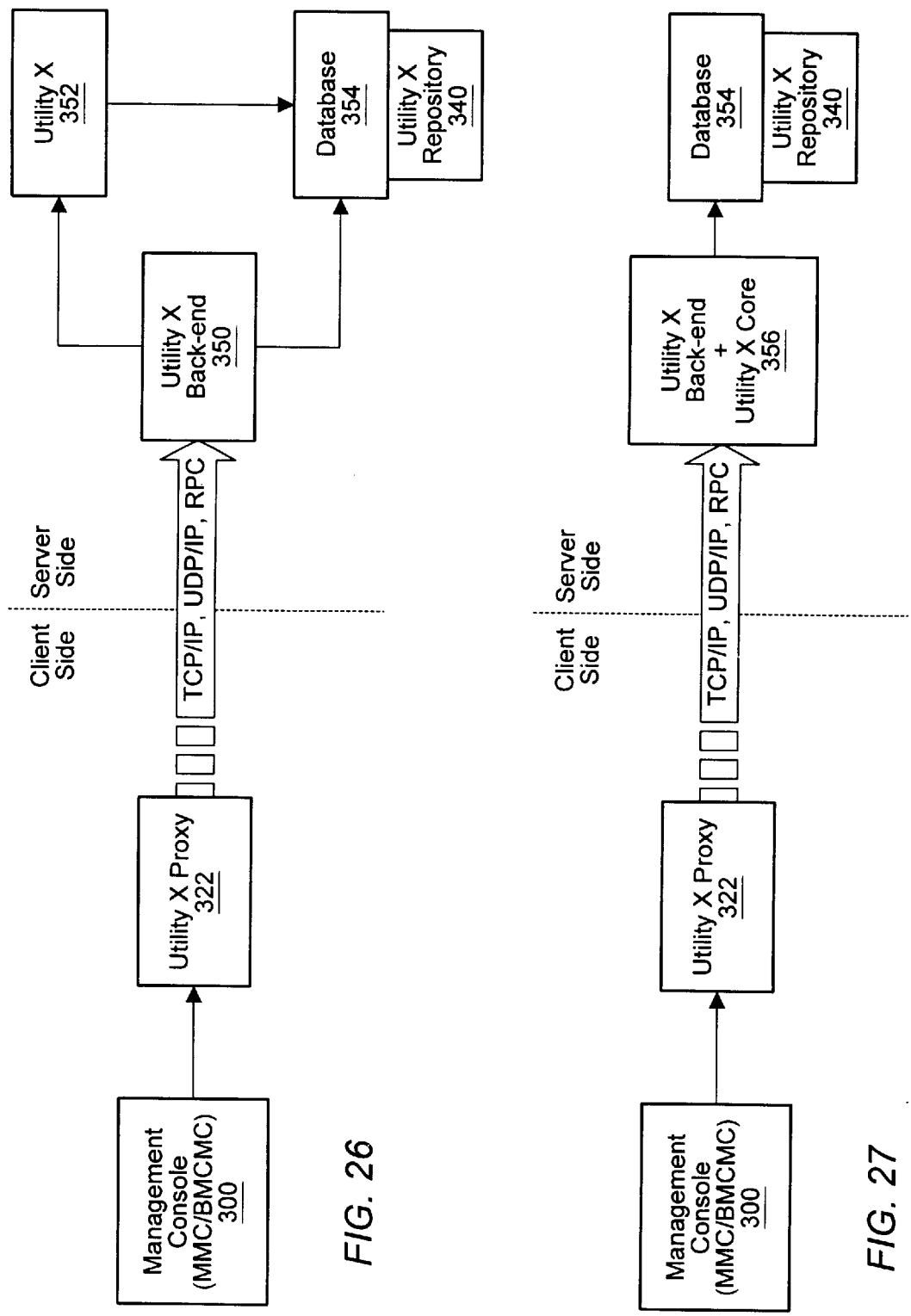
FIG. 26 illustrates the use of a utility proxy and utility back-end according to one embodiment.
FIG. 27 illustrates the use of a utility proxy and a utility with an integrated back-end according to one embodiment.

FIG. 26 illustrates the operation of a utility proxy for a stand-alone utility according to one embodiment. A utility X back-end 350 listens for instructions from the utility X proxy 322 and then issues the instructions to the utility X 352. The listener back-end component 350 receives client requests for job manipulation and job control, performs the requested service on the client's behalf, and returns the appropriate codes and/or data to the client. In one embodiment, a client's request to create or update a given job can be satisfied by the back-end 350 by accessing the local database directly. In one embodiment, for instance, when the database resides on the local host with the back-end 350, the back-end 350 uses the native libraries of the database. Therefore, it is not necessary to have database-specific components installed on the client side. In a further embodiment, the utility proxy 322 and back-end 350 are implemented in a seamless, distributed namespace with publish-and-subscribe options.

Figure 28:
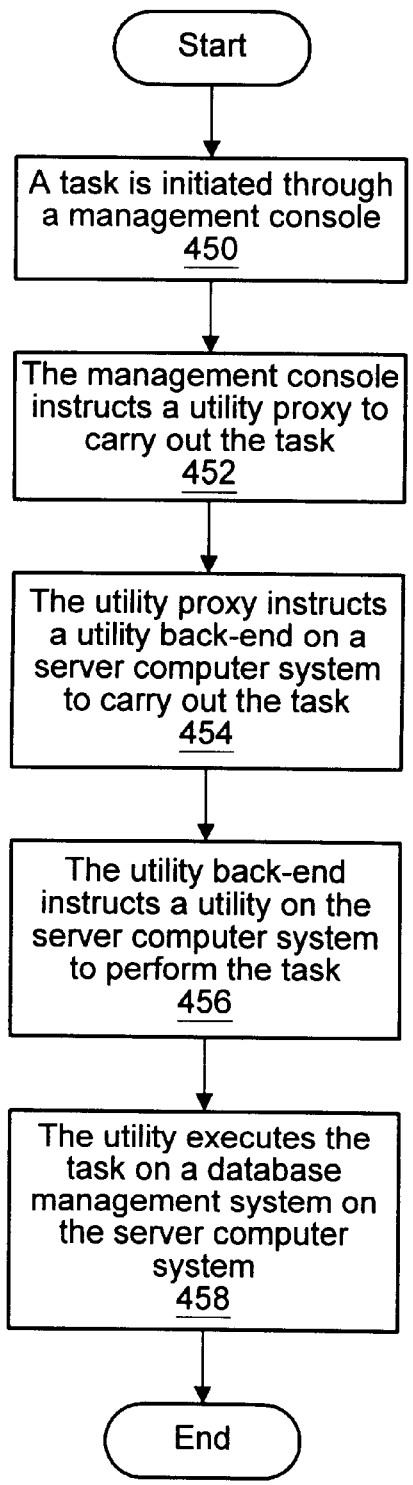
FIG. 28 is a flowchart which illustrates the use of the utility proxy and utility back-end according to one embodiment.

FIG. 28 is a flowchart which illustrates the use of the utility proxy and utility back-end according to one embodiment. In step 450 a task is initiated through a management console 300 on a client computer system. In step 452 the management console 300 instructs a utility proxy 322 to carry out the task. In one embodiment, the instructions are passed through a COM interface for a utility proxy and/or utility job manager as set forth in detail below. In step 454 the utility proxy 322 instructs a utility back-end 350 on a server computer system to carry out the task. The instructions may be passed through an API, a COM interface, a remote procedure call (RPC), or any other suitable method. In step 456 the utility back-end 350 instructs a utility 352 on the server computer system to perform the task. The instructions may be passed through an API, a COM interface, a command-line text interface, or any other suitable method provided by the utility 352. In step 458 the utility 352 executes the task on a database management system 354 on the server computer system. The execution may occur through SQL, native library access, or any other suitable method.

Because the utility proxy 322 and associated utility back-end 350 are tightly-coupled components, a client's request to execute a given job can be honored by the back-end by either creating a new (local) process, or by integrating the execution of a utility into the back-end itself and using a multi-threaded approach. FIG. 27 illustrates the operation of a utility proxy for an integrated utility according to one embodiment. The integrated utility 356 comprises both the back-end and the "core" of utility X. In various embodiments, Windows-to-UNIX utility proxy 322 to utility back-end 350 connectivity can be implemented using TCP/IP, UDP/IP or a compatible RPC technology. Distributed COM (DCOM) is a preferred means of communication for Windows-to-Windows connectivity.

Figure 29:
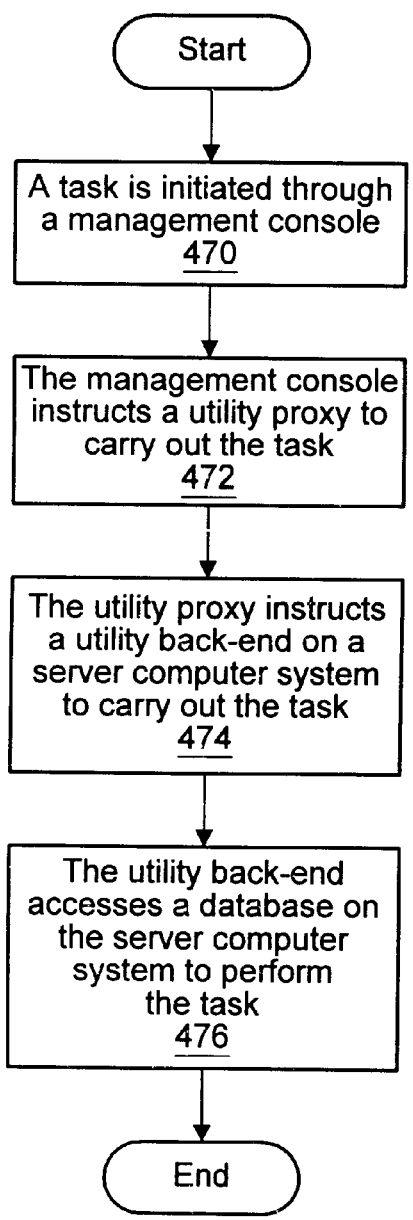
FIG. 29 is a flowchart which illustrates the use of the utility proxy and a utility with an integrated back-end according to one embodiment.

FIG. 29 is a flowchart which illustrates the use of the utility proxy and a utility with an integrated back-end according to one embodiment. In step 470 a task is initiated through a management console 300 on a client computer system. In step 472 the management console 300 instructs a utility proxy 322 to carry out the task. In one embodiment, the instructions are passed through a COM interface for a utility proxy and/or utility job manager as set forth in detail below. In step 474 the utility proxy 322 instructs an integrated utility back-end 356 on a server computer system to carry out the task. The instructions may be passed through an API, a COM interface, a remote procedure call (RPC), or any other suitable method. In step 476 the integrated utility back-end 356 accesses a database 354 on the server computer system to perform the task. The database access may occur through SQL, native library access, or any other suitable method.

Each utility has an associated repository: as shown in FIGS. 5a, 26, and 27, utility X has a repository 340 and utility Y has a repository 342. The utility repositories store job definitions, history, and status tracking information. In one embodiment, each job definition is stored with a unique identifier. A utility may run jobs that have previously been entered into its repository. Maintaining a single repository for every utility provides a consistent, enterprise-wide view of the utility for multiple clients. Furthermore, a repository provides persistence: for example, if a network connection is broken, a client can reconnect and populate its GUI with the persistent state stored in the repository.

Many benefits accrue from employing a utility proxy. By providing a utility proxy and utility back-end, developers can typically utilize an existing utility as-is rather than re-writing the utility. Without a utility proxy, for example, a developer would have to modify an existing utility substantially in order for the utility to be directly accessible by a snap-in. In some cases, where a utility is provided by a vendor in a set of proprietary add-ons to a database, it may be practically impossible to modify the utility. By adding a utility proxy and back-end, however, it is possible to maintain the existing utility and any dependencies on it. The utility proxy therefore contributes to the stability of an enterprise that includes several disparate database management systems.

Furthermore, the management console and extension snap-in do not need to have intimate knowledge of the utility because this knowledge is provided in the utility proxy and utility back-end. In other words, the utility proxy and utility back-end provide encapsulation of this database-specific and utility-specific knowledge. For example, database access details are left to the utility back-end. As a result, the other client-side components such as snap-ins and GUI wizards are more generic and can be more easily integrated into a common GUI in the improved management console. Without the utility proxy, however, this information must be stored in the client console or snap-in, and the console and/or snap-in must therefore be updated whenever the utility is updated. Therefore, a much greater amount of custom programming and maintenance of the console and/or snap-in are required without the utility proxy.

In a preferred embodiment, the management console 300, snap-ins 306, 308, and 310, and GUI wizards 312 and 314 are located on the client computer system or console node. Furthermore, the database access proxy 316, generic SQL component 318, utility job managers 320 and 324, and utility proxies 322 and 326 are also preferably located on the client computer system or console node. However, in another embodiment these "client side" components 316, 318, 320, 324, 322, and 326 may be located on a server node rather than the console node. The databases 336 and 338 and associated access components 328 and 330, the server side utility components 332 and 334, and the utility repositories 340 and 342 are preferably located on one or more server nodes in the enterprise 200.

GUI Wizard COM Interface

A wizard preferably exposes the following COM interface, as represented in Interface Definition Language (IDL):

```
HRESULT IUtilityWizard::ShowWizard
(
    void                                    // the Wizard asks for parameters
);
HRESULT IUtilityWizard::CreateJob
(
    [in, string] LPCOLESTR lpDbType,        // "Oracle"
    [in, string] LPCOLESTR lpDbName,        // "suppliers_ORCL"
    [in, string] LPCOLESTR lpDbLogon,       // "system"
    [in, string] LPCOLESTR lpDbPasswd,      // "itsasecret"
    [in, string] LPCOLESTR lpObjectType,    // "TABLESPACES"
    [in, string] LPCOLESTR lpObjects        // "RETAIL, WHOLESALE"
    [in, string] LPCOLESTR lpHostName,      // "suppliers"
    [in, string] LPCOLESTR lpHostLogon,     // "root"
    [in, string] LPCOLESTR lpHostPasswd,    // "topsecret"
    [in] BOOL bRunNow,                      // TRUE to run immediately
    [out] JOB_ID* lpJobId                   // ptr to new ID for job
);
HRESULT IUtilityWizard::EditJob
(
    [in, string] LPCOLESTR lpDbType,        // "Oracle"
    [in, string] LPCOLESTR lpDbName,        // "suppliers_ORCL"
    [in, string] LPCOLESTR lpDbLogon,       // "system"
    [in, string] LPCOLESTR lpDbPasswd,      // "itsasecret"
    [in] JOB_ID JobId                       // ID of job
);
HRESULT IUtilityWizard::AppendJob
(
```

-continued

```
    [in, string] LPCOLESTR lpDbType,       // "Oracle"
    [in, string] LPCOLESTR lpDbName,       // "suppliers_ORCL"
    [in, string] LPCOLESTR lpDbLogon,      // "system"
    [in, string] LPCOLESTR lpDbPasswd,     // "itsasecret"
    [in, string] LPCOLESTR lpObjectType,   // "TABLESPACES"
    [in, string] LPCOLESTR lpObjects       // "INHOUSE"
    [in] JOB_ID JobId                      // ID of job
);
```

Database Access Proxy COM Interface

The database access proxy preferably exposes the following COM interface, as represented in Interface Definition Language (IDL):

```
HRESULT IDbAccess::Connect
(
    [in, string] LPCOLESTR lpDbType,       // "Oracle"
    [in, string] LPCOLESTR lpDbName,       // "suppliers_ORCL"
    [in, string] LPCOLESTR lpDbLogon,      // "system"
    [in, string] LPCOLESTR lpDbPasswd      // "itsasecret"
);
HRESULT IDbAccess::Execute
(
    [in, string] LPCOLESTR lpSQLstatement  // "select * from dual"
);
HRESULT IDbAccess::GetColInfo
(
    [out] LPROWINFO lpRowInfo              // result set description
);
HRESULT IDbAccess::Fetch
(
    [out] LPROWDATA lpRowData              // ptr to next row in result set
);
HRESULT IDbAccess::Disconnect
(
    void
);
typedef struct tagColInfo
{
    int       nSize;                       // size of column
    [string] LPCOLESTR lpName;             // name of column
} COLINFO, *LPCOLINFO;
typedef struct tagRowInfo
{
    int       nCols;                       // number of columns
    [size_is(nCols)] LPCOLINFO lpColInfo;  // first column info block
} ROWINFO, *LPROWINFO;
typedef struct tagRowData
{
    int       nCols;                              // number of column buffers
    [size_is(nCols), string] LPCOLESTR* lppColData;  // array of column buffers
} ROWDATA, *LPROWDATA;
```

Utility Proxy COM Interfaces

In a preferred embodiment, each instance of a utility proxy on the client side is specific to an installation of a particular utility on the server side. The utility's job manager uses the utility proxy as the client-side API to communicate to the server-side utility. Each utility preferably defines and provides definitions for the following structures:

UTILITY_VERSION
JOB_ID
JOB_DEFINITION
JOB_STATUS
JOB_SCHEDULE

The methods preferably exposed by the utility proxy interface are as follows, as represented in Interface Definition Language (IDL):

```
HRESULT IUtilityProxy::Connect
(
    [in, ref, string] LPCOLESTR szHostName,        // host of backend
    [in, ref, string] LPCOLESTR szLogin,           // host logon optional
    [in, ref, string] LPCOLESTR szPasswd,          // encryption optional
);
HRESULT IUtilityProxy::Disconnect
(
    void
);
HRESULT IUtilityProxy::GetVersion
(
    [out] UTILITY_VERSION* pVersion                // version, release, deltas
);
HRESULT IUtilityProxy::CreateNewJob
(
    [in, unique] JOB_DEFINITION* pJobDefinitionStruct,   // job data
    [out] JOB_ID* pJobID                           // unique job ID
);
HRESULT IUtilityProxy::GetJobData
(
    [in] JOB_ID jobID,                             // unique job ID
    [in] DWORD dwDataFlags,                        // mask
    [out, size_is(,*pdwDataLen)] BYTE** pJobData,  // flexible
    [out] DWORD* pdwDataLen
);
HRESULT IUtilityProxy::UpdateJobData
(
    [in] JOB_ID jobID,                             // unique job ID
    [in] DWORD dwDataFlags,                        // mask
    [in, ref, size_is(dwNewDataLen)] BYTE* pNewJobData,  // flexible
    [in] DWORD dwNewDataLen
);
HRESULT IUtilityProxy::DeleteJob
(
    [in] JOB_ID jobID,                             // unique job ID
);
HRESULT IUtilityProxy::ExecuteJob
(
    [in] JOB_ID jobID                              // unique job ID
);
HRESULT IUtilityProxy::QueryJobStatus
(
    [out, size_is(,*pdwNumJobs)] JOB_STATUS** ppJobStatusInformation,
    [out] DWORD* pdwNumJobs
);
```

Additionally, the following utility proxy methods are defined for advanced job control and history:

```
HRESULT IUtilityProxy::ScheduleJob
(
    [in] JOB_ID jobID,                             // unique job ID
    [in] JOB_SCHEDULE jobSched                     // undefined structure
);
HRESULT IUtilityProxy::CancelJob
(
    [in] JOB_ID jobID                              // unique job ID
);
HRESULT IUtilityProxy::PauseJob
(
    [in] JOB_ID jobID                              // unique job ID
);
HRESULT IUtilityProxy::RestartJob
(
    [in] JOB_ID jobID                              // unique job ID
);
HRESULT IUtilityProxy::StopJob
(
    [in] JOB_ID jobID                              // unique job ID
);
HRESULT IUtilityProxy::GetHistory
(
```

```
    [out, size_is(,*pNumJobs), string] JOB_STATUS pJobStatus,      // chronology
    [out] DWORD* pNumJobs                              // number of jobs
);
HRESULT IUtilityProxy::PurgeHistory
(
    [in] DWORD dwKeepThisMany                          // keep some history
);
```

Utility Job Manager COM Interface

Two major utility-specific components have a need to call into the job manager component: the extension snap-in and the GUI wizard for the utility. The job manager has a callback service for the extension snap-in. The extension snap-in registers a callback with the job manager in order to receive notifications regarding the status of known jobs upon callback registration, any change of state of the known jobs, and any new or deleted jobs on any given host. Callback registration happens when the console user chooses to monitor the activity in a given host by selecting it from the management console's scope pane. The extension snap-in registers a callback interface pointer with the job manager for this purpose. The definition of IManagementConsole-Callback has only one method that is invoked to notify the extension snap-in of any changes. In a preferred embodiment, JobStatusNotify is actually implemented in the extension snap-in. The utility's job manager COM interface includes all of the methods from the utility proxy interface. The additional COM interface exposed by the job manager is preferably defined as follows, as represented in Interface Definition Language (IDL):

```
HRESULT IManagementConsoleCallback::JobStatusNotify
(
    [in, size_is(numJobs)] JOB_ID* pJobID,             // utility defined
    [in, size_is(numJobs)] JOB_STATUS* pJobStatus,     // utility defined
    [in] long numJobs                                  // number of Jobs
);
HRESULT IUtilityJobManager::RegisterConsoleCallback
(
    [in] IManagementConsoleCallback* ipConsoleCallback,  // COM interface ptr
    [out] DWORD* pdwCallbackID                           // return ID for revoke
);
HRESULT IUtilityJobManager::RevokeConsoleCallback
(
    [in] DWORD dwCallbackID
);
```

Various embodiments further include receiving or storing instructions and/or data implemented in accordance with the foregoing description upon a carrier medium. Suitable carrier mediums include storage mediums or memory mediums such as magnetic or optical media, e.g., disk or CD-ROM, as well as signals such as electrical, electromagnetic, or digital signals, conveyed via a communication medium such as networks 202 and 204 and/or a wireless link.

Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A method for administering an enterprise, wherein the enterprise comprises one or more networked computers, the method comprising:

a management console displaying information regarding database objects in a plurality of disparate databases, wherein the management console integrates a plurality of utilities for performing functions on the plurality of disparate databases which are managed by a plurality of disparate database management systems, wherein the management console includes a single interface for the plurality of utilities;

selecting a database function from one of the plurality of utilities in response to user input;

selecting a database object from one of the plurality of disparate databases in response to user input;

performing the selected database function on the selected database object in response to said selecting the database function and said selecting the database object.

2. The method of claim 1, wherein the management console further includes a primary snap-in and a plurality of extension snap-ins, wherein each extension snap-in is configured to access one of the utilities.

3. The method of claim 2, wherein the primary snap-in is an object browser which enables operation of said management console displaying information regarding database objects in the plurality of disparate databases.

4. The method of claim 1, further comprising:

receiving selection input from a user through the single interface of the management console for said selecting a database function from one of the plurality of utilities in response to user input and said selecting a database object from one of the plurality of disparate databases in response to user input;

one of the extension snap-ins receiving the selection input.

5. The method of claim 4, further comprising:

providing the selection input to a utility proxy.

6. The method of claim 5, further comprising:

the utility proxy performing remote execution of the selected database function in response to said providing the selection input to the utility proxy.

7. The method of claim 2, wherein each of the plurality of extension snap-ins is coupled to a utility wizard, wherein each utility wizard comprises a user interface for one of the plurality of utilities.

8. The method of claim 7, wherein each utility wizard is configured to be launched from the management console.

9. The method of claim 7, wherein each utility wizard is implemented as a reusable software component.

10. The method of claim 1, wherein the selecting a database function from one of the plurality of utilities in response to user input occurs before the selecting a database object from one of the plurality of disparate databases in response to user input.

11. The method of claim 1, wherein the selecting a database function from one of the plurality of utilities in response to user input occurs after the selecting a database object from one of the plurality of disparate databases in response to user input.

12. A method for integrating user interfaces of disparate utilities into a single user interface in a management console on a computer system, the method comprising:

adding a primary snap-in to the management console;

extending the primary snap-in with a plurality of extension snap-ins, wherein each extension snap-in is configured to access one of the utilities;

linking each of the extension snap-ins to a utility wizard, wherein each utility wizard comprises a user interface for the utility that the linked extension snap-in is configured to access.

13. The method of claim 12, wherein each of the utility wizards is configured to be launched from the management console;

wherein the utility is configured to be executed through the user interface of the launched utility wizard.

14. The method of claim 12, wherein the primary snap-in is configurable to browse objects in one or more different database management systems.

15. The method of claim 12, wherein the plurality of utilities are database utilities, and wherein each extension snap-in provides access to one of the database utilities.

16. A system for managing database utilities with a common user interface, the system comprising:

one or more server computer systems which store a plurality of disparate database management systems for managing a plurality of disparate databases, wherein the one or more server computer systems also include a plurality of database utilities for performing functions on the plurality of disparate databases;

at least one client computer system coupled to the one or more server computer systems, wherein the at least one client computer system includes:

a CPU;

a system memory coupled to the CPU, wherein the system memory stores:

a management console which integrates user interfaces of the plurality of database utilities into a single user interface, wherein the single user interface of the management console is useable for executing any of the plurality of database utilities.

17. The system of claim 16, wherein the plurality of disparate database management systems comprise database management systems from different vendors.

18. The system of claim 16, wherein the system memory also stores:

a primary snap-in coupled to the management console for performing database object browsing;

a plurality of extension snap-ins coupled to the primary snap-in, wherein each extension snap-in is configured to access one of the database utilities.

19. The system of claim 18, wherein the system memory also stores:

a plurality of utility wizards, wherein each utility wizard is associated with one of the extension snap-ins, wherein each utility wizard comprises a user interface for executing the utility which is accessible to the associated extension snap-in, wherein each of the extension snap-ins is configured to access its associated utility wizard.

20. The system of claim 18, wherein the system memory also stores:

at least one utility proxy for remotely executing at least one of the database utilities.

21. The system of claim 16, wherein the system memory also stores:

at least one utility proxy for remotely executing at least one of the database utilities.

22. The system of claim 16, wherein the system memory also stores:

at least one job manager for performing job management for at least one of the database utilities.

23. The system of claim 16, wherein at least one of the server computer systems stores a utility repository which is associated with one of the database utilities and one of the database management systems.

24. A carrier medium comprising program instructions for administering an enterprise, wherein the enterprise comprises one or more networked computers, wherein the program instructions are executable to implement:

a management console displaying information regarding database objects in a plurality of disparate databases, wherein the management console integrates a plurality of utilities for performing functions on the plurality of disparate databases which are managed by a plurality of disparate database management systems, wherein the management console includes a single interface for the plurality of utilities;

selecting a database function from one of the plurality of utilities in response to user input;

selecting a database object from one of the plurality of disparate databases in response to user input; and performing the selected database function on the selected database object in response to said selecting the database function and said selecting the database object.

25. The carrier medium of claim 24, wherein the management console further includes a pri mary snap-in and a plurality of extension snap-ins, wherein each extension snap-in is configured to access one of the utilities.

26. The carrier medium of claim 25, wherein the primary snap-in is an object browser which enables operation of said management console displaying information regarding database objects in the plurality of disparate databases.

27. The carrier medium of claim 24, wherein the program instructions are further executable to implement:

receiving selection input from a user through the single interface of the management console for said selecting a database function from one of the plurality of utilities in response to user input and said selecting a database object from one of the plurality of disparate databases in response to user input;

one of the extension snap-ins receiving the selection input.

28. The carrier medium of claim 27, wherein the program instructions are further executable to implement:

providing the selection input to a utility proxy.

29. The carrier medium of claim 28, wherein the program instructions are further executable to implement:

the utility proxy performing remote execution of the selected database function in response to said providing the selection input to the utility proxy.

30. The carrier medium of claim 25, wherein each of the plurality of extension snap-ins is coupled to a utility wizard, wherein each utility wizard comprises a user interface for one of the plurality of utilities.

31. The carrier medium of claim 30, wherein each utility wizard is configured to be launched from the management console.

32. The carrier medium of claim 31, wherein each utility wizard is implemented as a reusable software component.

33. The carrier medium of claim 24, wherein the selecting a database function from one of the plurality of utilities in response to user input occurs before the selecting a database object from one of the plurality of disparate databases in response to user input.

34. The carrier medium of claim 24, wherein the selecting a database function from one of the plurality of utilities in response to user input occurs after the selecting a database object from one of the plurality of disparate databases in response to user input.

35. The carrier medium of claim 24, wherein the carrier medium is a memory medium.

\* \* \* \* \*